United States Patent [19]

Takahara et al.

[11] Patent Number: 5,450,613
[45] Date of Patent: Sep. 12, 1995

[54] MOBILE COMMUNICATIONS EQUIPMENT WHICH DETECTS AND NOTIFIES WHEN IT IS MOVED INTO OR OUT OF A SERVICE AREA

[75] Inventors: Yasuaki Takahara, Yokohama; Shigeyuki Sudo, Fujisawa; Shuuichi Sekiguchi, Yokohama, all of Japan

[73] Assignee: Hitachi, Ltd., Tokyo, Japan

[21] Appl. No.: 112,801

[22] Filed: Aug. 27, 1993

[30] Foreign Application Priority Data

Sep. 9, 1992 [JP] Japan .................................. 4-240976

[51] Int. Cl.⁶ .............................................. H04B 7/00
[52] U.S. Cl. .................................. 455/54.1; 455/38.2; 455/67.7; 340/825.4
[58] Field of Search ...................... 455/32.1, 38.2, 38.5, 455/54.1, 54.2, 56.1, 67.7; 340/825.4

[56] References Cited

U.S. PATENT DOCUMENTS

| 4,755,816 | 7/1988 | DeLuca et al. | 340/825.4 |
| 4,868,560 | 9/1989 | Oliwa et al. | 455/38.2 |
| 5,049,875 | 9/1991 | DeLuca et al. | 340/825.4 |
| 5,086,290 | 2/1992 | Murray et al. | 455/67.7 |
| 5,193,216 | 3/1993 | Davis | 455/67.7 |
| 5,203,013 | 4/1993 | Breeden et al. | 455/67.7 |
| 5,203,014 | 4/1993 | Wagai et al. | 455/38.2 |
| 5,327,578 | 7/1994 | Breeden et al. | 455/54.1 |

FOREIGN PATENT DOCUMENTS

| 59-146232 | 8/1984 | Japan . |
| 1-314442 | 12/1989 | Japan . |
| 1-318326 | 12/1989 | Japan . |
| 2-94826 | 4/1990 | Japan . |
| 3-120919 | 5/1991 | Japan . |
| 4-207724 | 7/1992 | Japan . |
| 4-250727 | 9/1992 | Japan . |

Primary Examiner—Edward F. Urban
Assistant Examiner—Mary M. Lin
Attorney, Agent, or Firm—Antonelli, Terry, Stout & Kraus

[57] ABSTRACT

A mobile communications equipment which communicates with another equipment through a base station, and in which the state change of the mobile communications equipment based on the movement thereof, such as the movement from outside a service area into the service area, is detected and is notified to the user of the mobile communications equipment. The notification is given by a method comprising the steps of accepting an instruction as to whether or not the user is to be notified that the state change has occurred between a state in which the equipment is communicable and a state in which it is incommunicable; analyzing if the communications are possible, on the basis of a signal sent from the base station, subject to the instruction of giving the notification; detecting the state change from the incommunicable state into the communicable state on the basis of the analyzed result; and notifying the user of the occurrence of the state change into the communicable state in response to the detection of the state change, by at least one notifying expedient selected from among production of a voice message, a notifying sound, a notifying light, and vibrations.

19 Claims, 17 Drawing Sheets

F I G. 6
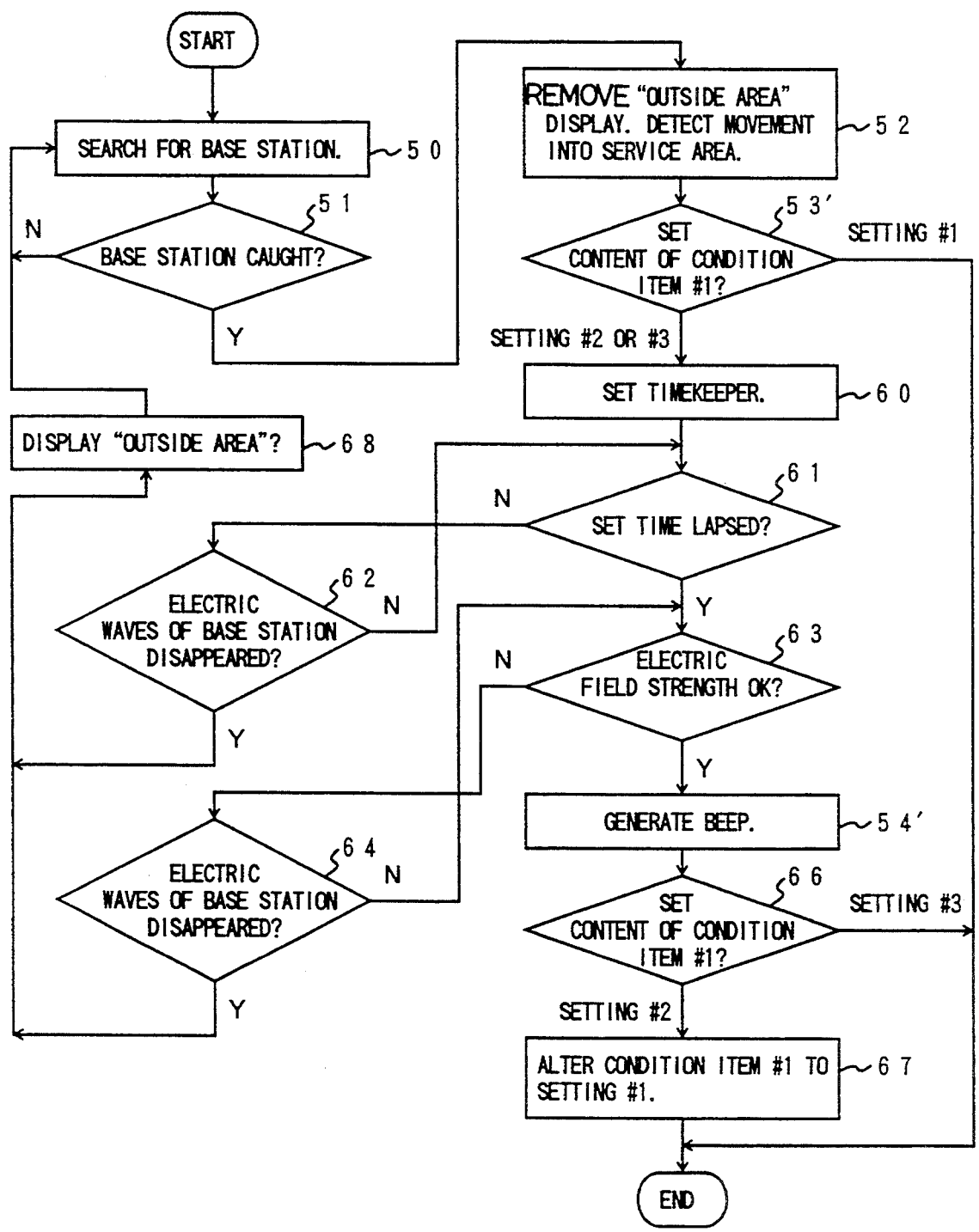

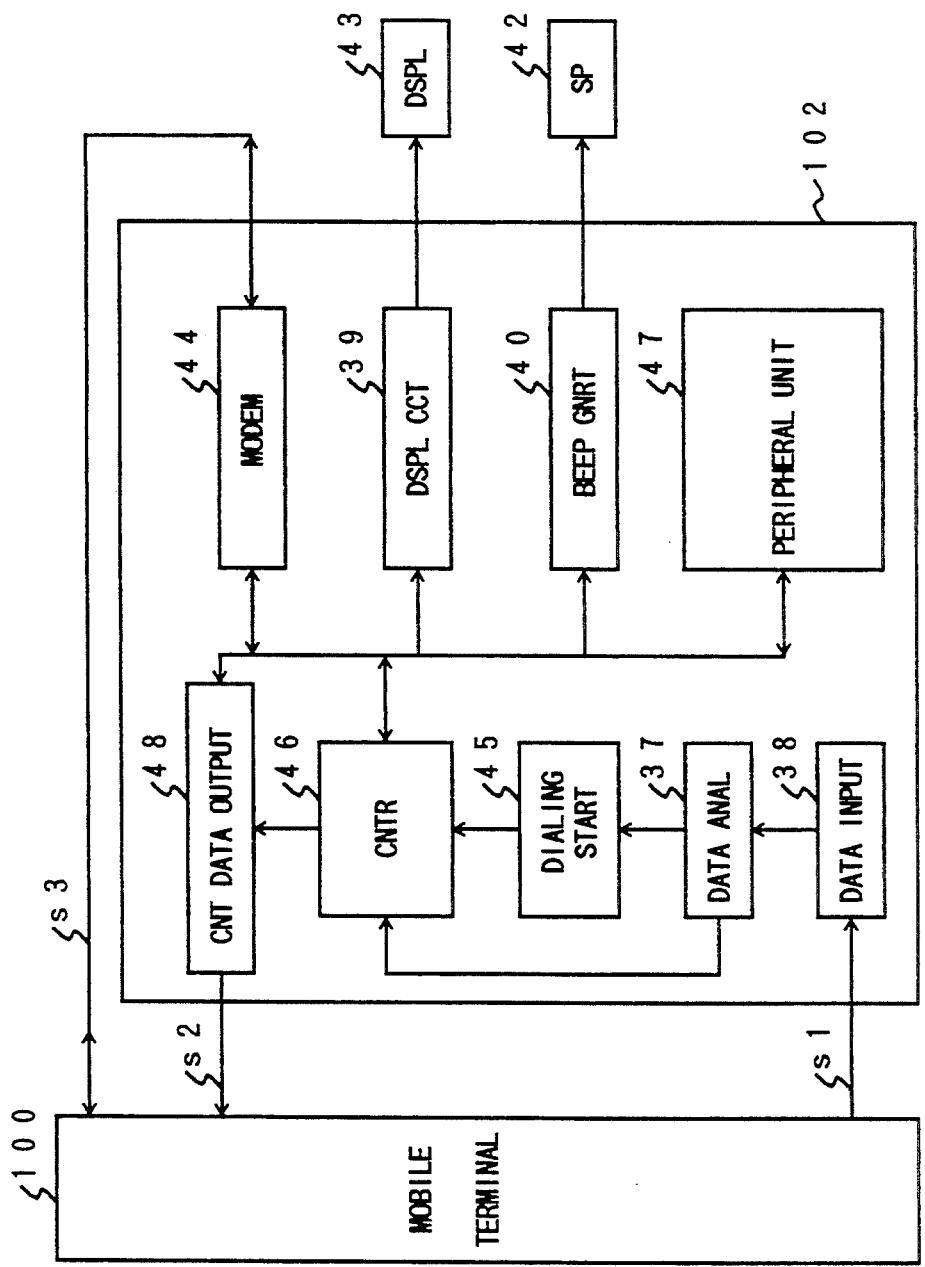

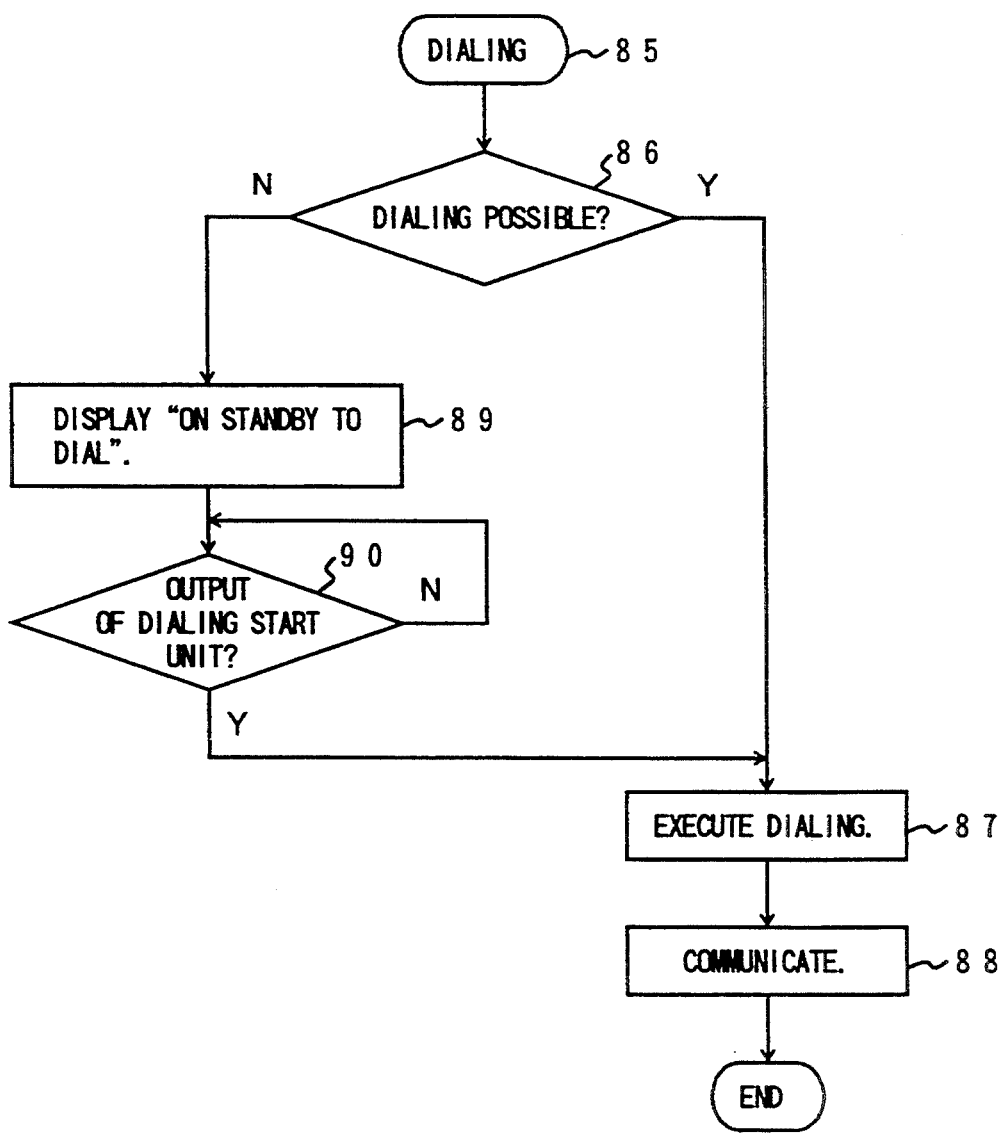

MOBILE COMMUNICATIONS EQUIPMENT WHICH DETECTS AND NOTIFIES WHEN IT IS MOVED INTO OR OUT OF A SERVICE AREA

BACKGROUND OF THE INVENTION

The present invention relates to mobile communications equipment. More particularly, the present invention relates to mobile communications equipment which is well suited to a case where a communications terminal moves out of a service area or to a case where it is connectible to a plurality of sorts of network.

In mobile communications, a radio channel for communication is established between a mobile communications terminal which moves on the ground, on the sea or in the sky and a base station or relay station which is fixed, e.g., on the ground or a satellite which is revolving round the earth. Whenever the base station or the like is located within a range in which a radio signal is reachable, the mobile communications terminal can be connected with the channel for both call origination and call termination. In a case where the mobile communications terminal is moving within such a service area, the user thereof need not especially worry about being able to talk. Since, however, base stations are not installed in all areas, the mobile communications terminal might move out of the service area. When the mobile terminal has moved out of the service area in this manner, a display is commonly presented on a display unit or the like to indicate that the mobile terminal currently lies in an area where communication is impossible.

With the conventional mobile communications terminal as stated above, unless the user looks at the display, he/she cannot judge whether or not the terminal is currently in the service area. In a case where the user wants to communicate while walking or while moving aboard an automobile or streetcar by way of example, he/she first checks the display of the mobile communications terminal. When the display indicates "outside the service area", the user abandons the desired communication. Thereafter, he/she needs to look at the display unit again and again in order to check if the terminal has entered the service area in which communication is possible. This is rather troublesome for the user. Especially when driving the automobile, the operation of checking the display can hamper the driving movement and is a serious hazard to safety.

Besides, in the case of a personal telephone set whose communicable range is as narrow as 10 [meters] ~ several hundred [meters], it is quite natural that the user will pass the service area without noticing his/her entry even when he/she is walking.

Techniques intended to solve the above drawbacks are disclosed in Japanese Patent Applications Laid-open No. 318326/1989, No. 250727/1992,No. 314442/1989 and No. 207724/1992. With each of the techniques stated in Japanese Patent Applications Laid-open No. 318326/1989 and No. 314442/1989, the first audible sound is generated when it is decided that a mobile communications equipment is lying inside the service area of a base station on the basis of a signal transmitted from the base station, and the second audible sound is generated when it is decided that the equipment is lying outside the service area. Thus, the user of the mobile communications equipment can be reliably informed as to whether or not the equipment lies within the service area. In addition, the technique stated in Japanese Patent Application Laid-open No. 250727/1992 provides reception means for detecting a communicable state through a base station, and transfer means adapted to turn "on" in accordance with a communicability signal detected by the reception means, for transferring the communicable state in terms of notification expedients such as a sound, a display and vibrations. In this way, the presence of the base station can be automatically made known through the use of the five senses in a car or on the street. Further, with the technique stated in Japanese Patent Application Laid-open No. 207724/1992, the reception levels of a plurality of sorts of signals from a transmitter are detected for deciding the quality of a reception state, the duration for which the reception state is decided to be no good is compared with a preset time period, and an output signal is produced when the duration has exceeded the preset time period.

With any of the above-described techniques, the user is notified that the mobile communications equipment has fallen into the communicable state. In this regard, even when not necessary, the notification is given whenever the communicable state has been established. That is, even when the user does not want to originate a call with the mobile communications equipment, he/she is notified. Accordingly, in the case where the notifying sound (beep) is used by way of example, it is useless information and is noisy.

Furthermore, increase in network offerers is expected owing to the progress of communications networks in the future. In this case, service contents, charges for communications, etc. might become different,depending upon the offerers of network, and users will select the type of to use. Nevertheless, the above-described techniques have not provided any convenient means for selecting one of the networks and for deciding whether or not the selected network is communicable.

SUMMARY OF THE INVENTION

The present invention has been made in order to solve the problems explained above, and has for its object to provide a mobile communications equipment which can detect the change of a state based on the movement thereof, such as the change from outside a service area into the service area, and which permits the user thereof to designate whether or not he/she is to be notified of the state change.

In the present invention, a mobile communications equipment for communicating with another equipment through a base station can comprise a radio-frequency signal circuit which receives a signal sent from the base station, and which transmits a signal directed back toward the base station, a demodulation circuit which demodulates the signal received by the radio-frequency signal circuit; input/output means for delivering the signal demodulated by the demodulation circuit, to a mobile communications equipment user, and for accepting an input signal to-be-transmitted from the user; a modulation circuit which modulates the signal accepted by the input/output means, and which delivers the modulated signal to the radio-frequency signal circuit; analysis means for analyzing whether or not the communications are possible, on the basis of the received signal of the radio-frequency signal circuit sent from the base station; detection means for detecting a change between a state in which the equipment is communicable and a state in which it is incommunicable, in accordance with an output of the analysis means; notification means for notifying the user of the state change when the state change has been detected by the detection means; an instruction input unit which accepts an instruction as to whether or not the notification is to be given by the notification means in response to the state change detection of the detection means; and control means for controlling the notification means so as to inhibit the notification in a case where the instruction accepted by the instruction input unit indicates that notification is not to be given.

It is allowed that the notification means includes at least two constituent means selected from the group consisting of message output means for producing a voice message as the notification; sound output means for producing a notifying sound as the notification; optical indication means for producing a notifying light as the notification; and vibration means for producing vibrations as the notification. In this case, the control means can select different constituent means of the notification means for the detected state change from the incommunicable state into the communicable state to that used for the change from the communicable state into the incommunicable state.

The instruction input unit can further accept an instruction for selecting which of the at least two constituent means of the notification means is to be used for the notification; and the control means can select any of the constituent means of the notification means in accordance with the selection instruction accepted by the instruction input unit. The message output means, the sound output means, the optical indication means, and the vibration means can produce at least two sorts of voice messages, at least two sorts of notifying sounds, at least two sorts of notifying lights, and at least two sorts of vibrations, respectively; the instruction input unit can further accept instructions for selecting which of the at least two constituent means of the notification means and which of the sorts of the outputs to-be-produced are to be used for the notification; and the control means can select any of the constituents means of the notification means and any of the sorts of the outputs in accordance with the selection instructions accepted by the instruction input unit or the control means can select the different sorts of the outputs to-be-produced of the constituent means of the notification means between at the detected state change of the detection means from the incommunicable state into the communicable state and at the change thereof from the communicable state into the incommunicable state.

It is possible that, when the notification of the notification means is to be given, the instruction input unit further accepts an instruction for selecting either of giving the notification in response to every state change and giving the notification in response to only the first state change after the selection instruction; and that the control means controls the notification means in accordance with the selection instruction accepted by the instruction input unit.

Further, the mobile communications equipment can further comprise timekeeping means for detecting the fact that no state change has taken place for a predetermined time period since the last state change; the control means deciding settlement of the last state change in accordance with the detection of the timekeeping means and then controlling the notification means so as to give notification. In this case, it is possible that the instruction input unit can further accept an instruction for selecting as a condition for giving the notification, either of the state change detection of the detection means and the detected fact of the timekeeping means; and that the control means controls the notification means in accordance with the selection instruction accepted by the instruction input unit.

In addition, the mobile communications equipment can further comprise electric field strength detection means for detecting a received electric field strength of the signal received by the radio-frequency signal circuit; the control means deciding settlement of the communicable state and controlling the notification means so as to give the notification in a case where the change into the communicable state as based on the analysis of the analysis means has been detected by the detection means and where the detected electric field strength of the electric field strength detection means has reached a predetermined electric field strength. In this case, it is possible that the instruction input unit can further accept an instruction for selecting either of the specified situation and the state change detection of the detection means as a condition for giving the notification; and that the control means controls the notification means in accordance with the selection instruction accepted by the instruction input unit.

The detection means is allowed to detect only the state change from the incommunicable state into the communicable state as based on the analysis of the analysis means. Alternatively, the detection means can detect both the state change from the incommunicable state into the communicable state as based on the analysis of the analysis means and the state change from the communicable state into said incommunicable state.

Besides, the instruction input unit can accept identification information of the other equipment, and the mobile communications equipment can further comprise a memory which stores therein the identification information accepted by the instruction input unit; a starter which starts commencement of the communications in accordance with the stored identification information of the memory; and a checker which is furnished with an autodialing mode for commanding the starter to start the communications commencement in response to the change from the incommunicable state into the communicable state as detected by the detection means, in a case where an instruction for the communications commencement has been accepted in the incommunicable state by the instruction input unit.

In addition, the checker may well include means for selectively enabling the autodialing mode.

It is also possible that the notification means is furnished with at least two sorts of output aspects; the instruction input unit further accepts an instruction for selecting which of the output aspects is to be used for the notification; and the control means selects any of the output aspects in accordance with the selection instruction accepted by the instruction input unit, or the control means selects the different output aspects between at the detected state change of the detection means from the incommunicable state into the communicable state and at the change thereof from the communicable state into the incommunicable state.

Moreover, in the presence of a plurality of sorts of network, it is possible that the mobile communications equipment further comprises network registration means for registering available sorts of network; that the analysis means further decides that any of the sorts of network are communicable on the basis of the signal received by the radio-frequency signal circuit; that the detection means detects the state change of the decided sort of communicable network on the basis of the analyzed result of the analysis means; and that the notification means gives notification when the state change of the decided sort of communicable network has been detected by the detection means. In this case, the equipment is also allowed to further comprise network priority setting means for setting priority levels for the sorts of network, and for selecting any of the networks in accordance with the set priority levels. Besides, the notification means can be furnished with at least two sorts of output aspects; and the control means stipulates the different output aspects for the respective sorts of the networks beforehand, and selects any of the output aspects corresponding to the sort of the network having undergone the state change. The notification means includes at least two constituent means selected from the group consisting of message output means for producing a voice message as the notification; sound output means for producing a notifying sound as the notification; optical indication means for producing a notifying light as the notification; and vibration means for producing vibrations as the notification; and the control means stipulates the different constituent means of the notification means for the respective sorts of the networks beforehand, and selects any of the constituent means corresponding to the sort of the network having undergone the state change. Further, when each of the multiple notification means have at least more than two sorts of constituent means, the control means stipulates the sorts of the outputs to-be-produced of the constituent means of the notification means for the respective sorts of the networks beforehand, and selects any of the sorts of the outputs of the constituent means corresponding to the sort of network having undergone the state change.

As an alternative aspect of performance, the mobile communications equipment further comprises network registration means for registering available sorts of network; the analysis means further analyzing the networks being communicable on the basis of the signal received by the radio-frequency signal circuit, with reference to the network registration means; the detection means detecting the state change of each of the communicable networks on the basis of the analyzed result of the analysis means; the notification means giving notification when the state change of each communicable network has been detected by the detection means. In this case, the notification means can include at least two constituent means selected from the group consisting of message output means for producing a voice message as said notification; sound output means for producing a notifying sound as the notification; optical indication means for producing a notifying light as the notification; and vibration means for producing vibrations as the notification; and the control means stipulates the different constituent means of the notification means beforehand for the detected state change of the detection means from the incommunicable state into the communicable state, the change thereof from the communicable state into the incommunicable state, and the sorts of network, respectively, and selects any of the constituent means corresponding to the detected state change and the sort of network having undergone the state change. Further, when each of the multiple notification means have at least more than two sorts of constituent means, the control means stipulates the constituent means of the notification means and the sorts of the outputs to-be-produced of the constituent means beforehand for the detected state change of the detection means from the incommunicable state into the communicable state, the change thereof from the communicable state into the incommunicable state, and the sorts of network, respectively, and selects any of the sorts of said outputs of the constituent means corresponding to the detected state change and the sort of network having undergone the state change. Instead of stipulating the sort of outputs to-be-produced of the notification means, in accordance with the sort of outputs to-be-produced the instruction input unit can further accept instructions for selecting which of the constituent means of the notification means and which of the sorts of the outputs to-be-produced are to be used for the notification in accordance with the detected state change of the detection means from the incommunicable state into the communicable state, the change thereof from the communicable state into the incommunicable state, and the sorts of network, respectively; and the control means selects any of the constituent means of the notification means and any of the sorts of the outputs corresponding to the detected state change and the sort of network having undergone the state change, in accordance with the selection instructions accepted by said instruction input unit. Also in this case, the equipment can further comprise network priority setting means for setting priority levels for the sorts of network, and for selecting any network of higher priority level; the detection means detecting the state change of the network selected by the network priority setting means, on the basis of the analyzed result of the analysis means; the notification means notifying the user of the detected result of the detection means.

The constructions as described above can provide mobile communications terminals which are more convenient.

Meanwhile, a method for notification in a mobile communications equipment which communicates with another equipment through a base station can comprise the steps of accepting an instruction as to whether or not a user of the mobile communications equipment is to be notified that a state change has occurred between a state in which the equipment is communicable and a state in which it is incommunicable; analyzing if the communications are possible, on the basis of a signal sent from the base station, subject to the instructing of giving the notification; detecting the state change from the incommunicable state into the communicable state on the basis of the analyzed result; and notifying the user of the occurrence of the state change into the communicable state in response to the detection of the state change, by at least one notifying expedient selected from the group consisting of production of a voice message, that of a notifying sound, that of a notifying light, and that of vibrations. Besides, a network selecting method in the presence of a plurality of available networks can comprise the steps of registering sorts of predetermined network beforehand, setting predetermined priority levels for the sorts of network; analyzing if the networks are communicable; detecting that the network of higher priority level has changed from an incommunicable state into a communicable states and giving the notification in response to the detection of the state change.

Further, a mobile communications equipment for communicating with another equipment through a base station may comprise a radio-frequency signal circuit which receives a signal sent from the base station, and which transmits a signal directed toward the base station, a demodulation circuit which demodulates the signal received by the radio-frequency signal circuit, input/output means for delivering the signal demodulated by the demodulation circuit, to a user of the mobile communications equipment, and for accepting an input signal to-be-transmitted from the user; a modulation circuit which modulates the signal accepted by the input/output means, and which delivers the modulated signal to the radio-frequency signal circuit; analysis means for analyzing if the communications are possible, on the basis of the received signal of the radio-frequency signal circuit sent from the base station; detection means for detecting a change between a state in which the equipment is communicable and a state in which it is incommunicable, in accordance with an output of the analysis means; and output means for externally delivering predetermined notifying information when the state change has been detected by the detection means.

In addition, a mobile communications system can comprise a mobile communications equipment which communicates with another equipment through a base station, and a peripheral equipment which is connected to the mobile communications equipment; the mobile communications equipment including a radio-frequency signal circuit which receives a signal sent from the base station, and which transmits a signal directed toward the base station; a demodulation circuit which demodulates the signal received by the radio-frequency signal circuit; input/output means for delivering the signal demodulated by the demodulation circuit, to a user of the mobile communications equipment, and for accepting an input signal to-be-transmitted from the user; a modulation circuit which modulates the signal accepted by the input/output means, and which delivers the modulated signal to the radio-frequency signal circuit; analysis means for analyzing if the communications are possible, on the basis of the received signal of the radio-frequency signal circuit sent from the base station; detection means for detecting a change between a state in which the mobile communications equipment is communicable and a state in which it is incommunicable, in accordance with an output of the analysis means; and output means for delivering predetermined notifying information to the peripheral equipment when the state change has been detected by the detection means; the peripheral equipment including input means for receiving the notifying information delivered from the output means of the mobile communications equipment; analysis means for analyzing a content of the notifying information accepted by the input means; and notification means for performing a predetermined notifying operation on the basis of the analysis of the analysis means.

In this case, the peripheral equipment can further include an instruction input unit which accepts identification information of the other mobile communications equipment; a memory which stores therein the identification information accepted by the instruction input unit; a start command unit which commands the mobile communications equipment to start commencement of the communications in accordance with the stored identification information of the memory; and a checker which is furnished with an autodialing mode for actuating the start command unit in response to the change from the incommunicable state into the communicable state as detected by the detection means, in a case where an instruction for the communications commencement has been accepted in the incommunicable state by the instruction input unit.

In operation, the analysis means analyzes the received signal, and it delivers the output indicative of the communicable state when the mobile communications terminal has moved from outside the service area into the service area. The detection means senses the state change on the basis of the output of the analysis means. The instruction input unit accepts the instruction as to whether or not the notification is to be given by the notification means in response to the state change. In a case where the instruction accepted by the instruction input unit appoints that the notification is not to be given, the control means controls the notification means so as to inhibit the notification. Subject to giving the notification, the notification means responds to the state change in such a way that the notifying message is given by the message output means, that the sound is produced by the sound output means, that the light is flickered by the optical indication means, or that the vibrations are developed by the vibration means. Herein, the aspect of notification of each notification means can be made different between at the detected state change of the detection means from the incommunicable state into the communicable state and at the change from the communicable state into the incommunicable state, through the control of the control means. Alternatively, the instruction input unit accepts the instruction for selecting that (those) constituent means of the notification means which is (are) to be used for the notification, whereupon the control means controls the notification means so as to actuate the selected constituent means, in conformity with the selection instruction accepted by the instruction input unit. Thus, the notification means notifies the user of the communicability under the control of the control means. In this way, the user can know the communicability more conveniently without expressly checking the disappearance of a display "OUTSIDE SERVICE AREA" on the display unit. In particular, even when the user is driving an automobile, he/she can confirm the entry into the service area without any hindrance to his/her driving movement. This is effective for safety.

Besides, regarding the terminal which can select any of a plurality of network services or any of network offered by a plurality of enterprises, such as an automobile telephone set, a satellite radiotelephone set or a cordless telephone set, the notification can be given in response to the establishment of the communicability of the desired network or service by setting the priority levels of the network or services in the network priority setting means beforehand. Alternatively, the network or service whose priority level is higher in accordance with the priority levels of the network or services set in the priority setting means and which is in the communicable state may well be selected for notifying the user of the state change.

Further, when the handled signal has become unreceivable, the output of the analysis means changes, and the detection means senses the state change. Then, the notification means notifies the user of the fact that the mobile communications equipment has gone out of the service area. On this occasion, the notification means notifies the user of the incommunicability in conformity with the setting in the control means in such a way that the notifying message is given by the message output means, that the sound is produced by the sound output means, that the light is flickered by the optical indication means, or that the vibrations are developed by the vibration means.

Owing to the above operations, the user can know the change into the incommunicable or communicable state without expressly checking the display of the display unit, only when necessary. Accordingly, the convenience of the mobile communications equipment is enhanced. Further, the notification means may well produce the sound at different intervals or in different tone colors, deliver different notifying messages or flicker the light in different aspects, depending upon those outputs of the analysis means which indicate the communicability, the incommunicability, the availability of the service of any network set in the network priority setting means, etc. Thus, the user can distinguish the situations, and the convenience of the equipment is enhanced more.

Besides, when the control means is set so as to select any of the notifying operations or to control the number of times of performance of the selected notifying operation, the user can properly utilize the aspects of the notification in TPO (time, place, occasion) fashion. Accordingly, the convenience is enhanced still more.

Further, the electric field strength detection means measures the strength of the received electric wave, and the timekeeping means measures the preset time period, thereby permitting the user to judge the stability of the communicable state from the strength of the electric wave and the continuance of the state. This can enhance the accuracy and reliability of the notifying operation.

Still further, the checker checks the preset conditions such as the sort of the network for use set in the network priority setting means, the point of time for starting the dialing operation, and a set charge for utilizing the network, by comparing the analyzed outputs of the analysis means with them. When all the conditions have been met, the dialing start means starts the dialing operation by the use of the dialing No. or identification information of the opposite party of the communications as stored in the memory. This measure makes it possible to provide the mobile communications equipment which is more convenient. Besides, before the start of the communications, the checker may well request the operator to acknowledge the propriety of the dialing operation by a vocal reply or a keying operation. Thus, the erroneous start of the dialing operation can be prevented in, e.g., a case where the operator is absent or where the operator cannot reply. This measure makes it possible to provide the mobile communications equipment which is more convenient.

Yet further, the mobile communications equipment may well comprise the output means for externally delivering the predetermined notification information in response to the state change detection of the detection means. In this case, the peripheral equipment can be connected as the external device of the mobile communications equipment. In the peripheral equipment, the input means receives the notifying information delivered from the output means of the mobile communications equipment. The analysis means analyzes the content of the notifying information accepted by the input means. The notification means performs the predetermined notifying operation in response to the analysis of the analysis means supplied thereto. This notification means may well include a display unit which displays a message on its display screen, in addition to constituent means as described before, that is, message output means for producing a voice message as the notification, sound output means for producing a notifying sound as the notification, optical indication means for producing a notifying light as the notification, and vibration means for producing vibrations as the notification. Further, in a case where the peripheral equipment is a facsimile equipment or the like, the instruction input unit accepts the identification information of the other mobile communications equipment. The memory stores therein the identification information accepted by the instruction input unit. In the autodialing mode, on condition that the instruction for the commencement of the communications has been accepted in the incommunicable state by the instruction input unit, the start command unit commands the mobile communications equipment to start the communications commencement in accordance with the stored identification information of the memory, in response to the change from the incommunicable state into the communicable state as detected by the detection means. Thus, the user is automatically dialed when the communicable state has been established. It is accordingly possible to provide the mobile communications equipment which is highly convenient.

BRIEF DESCRIPTION OF THE DRAWINGS

FIG. 6 is a flow chart showing an example of the operation of the third embodiment of the present invention;

FIG. 16 is a block diagram showing the construction of a peripheral equipment in the eighth embodiment of the present invention; and FIG. 17 is a flow chart showing the operation of the eighth embodiment of the present invention.

PREFERRED EMBODIMENTS OF THE INVENTION

Now, the embodiments of the present invention will be described in conjunction with the accompanying drawings.

Figure 1:
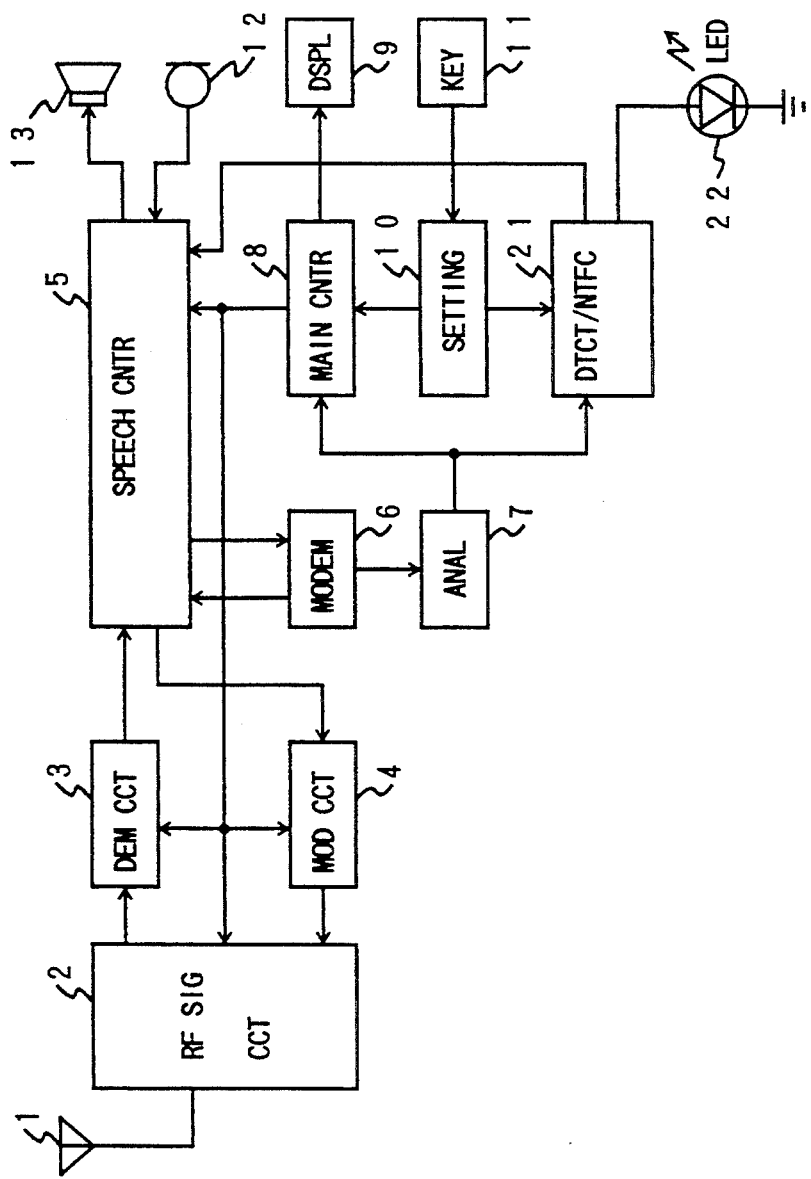
FIG. 1 is a block diagram showing the construction of the first embodiment of the present invention.

FIG. 1 is a block diagram showing the first embodiment of the present invention, in which the present invention is applied to an automobile telephone. Referring to FIG. 1, a mobile communications equipment in this embodiment comprises an antenna 1, and a radio-frequency signal circuit 2 which receives a signal sent from another equipment and transmits a signal directed toward the other equipment and which processes the radio-frequency signals. A demodulation circuit 3 demodulates the received signal, while a modulation circuit 4 modulates the signal to-be-transmitted. A speech controller 5 performs the filtering of a speech signal received or to-be-transmitted, and also performs the generation of a ringing tone or a warning sound, the control of a speech route, etc. A modem circuit 6 demodulates system control data inserted between speech data, into digital data, and it also modulates such digital data. An analyzer 7 analyzes the received system control information, and delivers the analyzed result to a main controller 8. The analyzer 7 serves also as analysis means for analyzing whether or not the communications of the pertinent equipment with the other equipment are possible. The main controller 8 controls the operation of the whole equipment functioning as an automobile telephone set. Display means 9 is, for example, a display unit made of liquid crystal or the like. It displays the data of a dialing input and the state of the automobile telephone set proper. Shown at numeral 11 is a key circuit which serves as an instruction input unit, and which accepts key inputs for the dialing, etc. A setting unit 10 which serves as setting means analyzes the depressions of the keys 11, and delivers a set Content to the main controller 8. A microphone 12 and a speaker 13 constitute input/output means, herein the handset of the telephone set. The microphone 12 accepts an external signal, or converts the voice signal into an electric signal. On the other hand, the speaker 13 converts the signal demodulated by the demodulation circuit 3, into a voice signal which is externally given forth. The construction explained above is similar to the main construction of an automobile telephone set in the prior art. In this embodiment, the automobile telephone set is additionally provided with a detection/notification unit 21 and an LED (light emitting diode) 22. The detection/notification unit 21 includes detection means for detecting the state change between the communicable state of the equipment and the incommunicable state thereof on the basis of the analyzed result of the analyzer 7, and notification means for giving notification to the user of the equipment when the state change has been detected by the detection means. Besides, the notification means includes at least one constituent notification means selected from among message output means for producing a voice message as the notification, sound output means for producing a notifying sound (beep) as the notification, optical indication means for producing a notifying light as the notification, and vibration means for producing vibrations as the notification. In this embodiment, the case of utilizing the LED 22 for emitting the notifying light of the optical indication means is exemplified as the notification means. The LED 22 can be kept continuously lit or it can be flickered.

Whether or not the automobile telephone set lies within a service area in which it is communicable, is decided in such a way that the analyzer 7 receives the system control data which are continually sent by a base station installed on the ground. Among electric waves received by the antenna 1, the signal at a specified frequency (namely, in a specified radio channel) is selected and amplified by the radio-frequency signal circuit 2. The received signal is demodulated by the demodulation circuit 3, and the demodulated signal is delivered to the speech controller 5. In the speech controller 5, the speech signal and the system control signal are separated by filtering. The system control signal is demodulated by the modem 6 into the digital data, the content of which is thereafter analyzed by the analyzer 7. The main controller 8 controls the operation of the whole automobile telephone set on the basis of the analyzed result of the analyzer 7. Accordingly, whether or not the telephone set lies within the service area can be decided from the analyzed result of the analyzer 7. By way of example, in a case where the telephone set has moved out of the service area, the system control signal sent from the base station cannot be normally received, and hence, the output from the analyzer 7 ceases or disappears. The main controller 8 responsively controls the radio-frequency signal circuit 2 so as to alter the radio channel to another one and to check if a system control signal sent from another base station is receivable on the new channel. In a case where the system control signal cannot be picked up in any of the radio channels set, the main controller 8 controls the display unit 9 so as to present a display indicative of "outside the service area". Even after the display has been presented, the main controller 8 continues the receiving operation while changing the radio channel until the system control signal becomes receivable, that is, until the output of the analyzer 7 falls into the normal state. In the situation where the communicable radio channel is being searched for, the automobile telephone set is capable of neither call origination nor call termination. Therefore, even when the user depresses the keys 11, the main controller 8 operates to hinder the transmitting operation. In due course, when the system control signal has been normally received, the analyzer 7 supplies the main controller 8 with the analyzed result. The main controller 8 responsively controls the display unit 9 so as to remove the display "OUTSIDE SERVICE AREA". Thenceforth, the automobile telephone set is capable of both call origination and call termination.

In this embodiment, the detection/notification unit 21 and the LED 22 are added to the prior-art automobile telephone set. The output of the analyzer 7 is also applied to the detection/notification unit 21, which decides if the telephone set lies in the communicable area. When the telephone set has become communicable, the detection/notification unit 21 flickers the LED 22 or/and produces the notifying sound by controlling the speech controller 5, thereby notifying the user of the communicability. The user can set the operation of the detection/notification unit 21 via the setting unit 10 with the keys 11. In this embodiment, whether or not the notifying operation is to be performed can be set.

Figure 2:
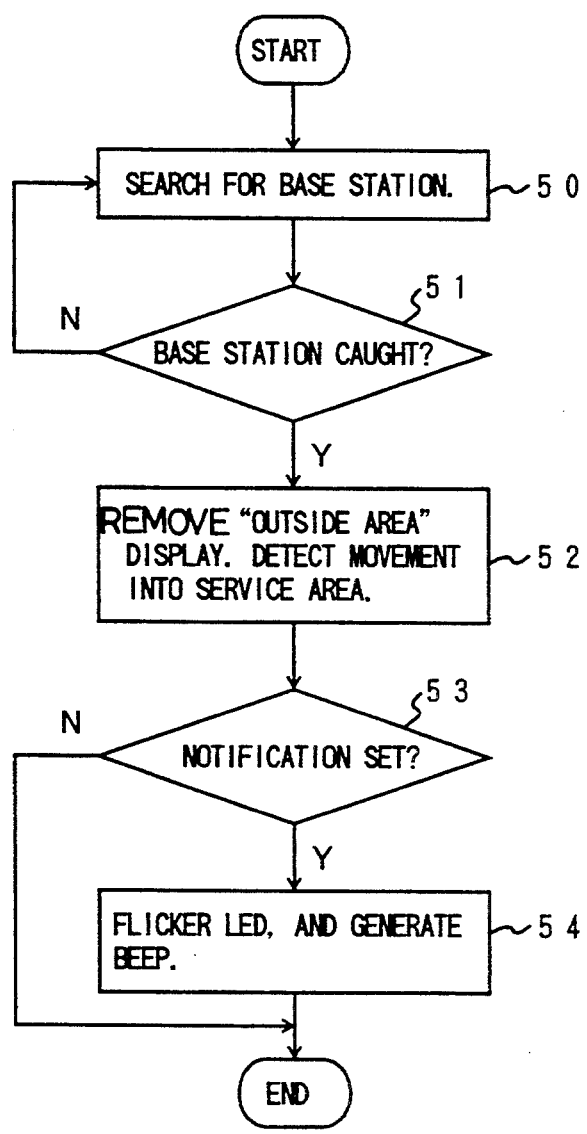
FIG. 2 is a flow chart showing an example of the operation of the first embodiment of the present invention.

Now, the operation of the embodiment shown in FIG. 1 will be described in detail with reference to FIGS. 1 and 2. FIG. 2 is a flow chart showing an example of the operation of this embodiment.

As stated before, when the automobile telephone terminal goes out of the service area, the system control signal sent from the base station fails to be received. Under this state of the telephone terminal, the main controller 8 controls the display unit 9 so as to present the display "OUTSIDE SERVICE AREA". Thereafter, it changes the radio channel in order to search for a new base station (step 50). When the system control signal has been received during the search operation, whether or not the base station has been caught is decided (step 51). This decision is rendered in such a way that the analyzer 7 analyzes the content of the received signal to check if the signal is the system control signal of the new base station. When the received signal is not the system control signal, the main controller 8 changes the radio channel, and the routine returns to the step 50. In a case where the system control signal has been received to enable communication with the new base station, the display "OUTSIDE SERVICE AREA" presented on the display unit 9 is removed (step 52). The operations thus far explained are the same as in the prior-art automobile telephone terminal. In this embodiment, when the analyzed result of the analyzer 7 indicates the communication with the base station, the detection means of the detection/notification unit 21 detects that the state of the telephone terminal has changed. Herein, when the state change is from the incommunicable state into the communicable state, how the operation of the detection/notification unit 21 is set is checked (step 53). In this embodiment, whether or not the detection/notification unit 21 is to perform the notifying operation can be set through the setting unit 10. Therefore, the detection/notification unit 21 first checks if the notifying operation is set. The routine proceeds to a step 54 when the notifying operation is set, and it is directly ended when not. On condition that the notifying operation is set, the detection/notification unit 21 flickers the LED 22, and it also controls the speech controller 5 so as to emit the notifying sound (beep) from the speaker 13 (step 54). Owing to the above operating features operations, when the automobile telephone terminal has picked up the new base station, not only is the display "OUTSIDE SERVICE AREA" removed, but also the LED 22 is flickered while at the same time, the beep is produced from the speaker 13. Therefore, the operator of the telephone terminal can know the usability thereof without confirming the disappearance of the display "OUTSIDE SERVICE AREA" from the display unit 9, so that the convenience of the telephone terminal is enhanced. Especially in a case where the action of seeing the display unit 9 is, in itself, dangerous as in the case of driving an automobile in which the telephone terminal is installed, this embodiment is effective to enhance driving safety. Moreover, in this embodiment, the notifying operation of the detection/notification unit 21 can be set using the keys 11, so that the beep can be produced only when necessary.

Figure 3:
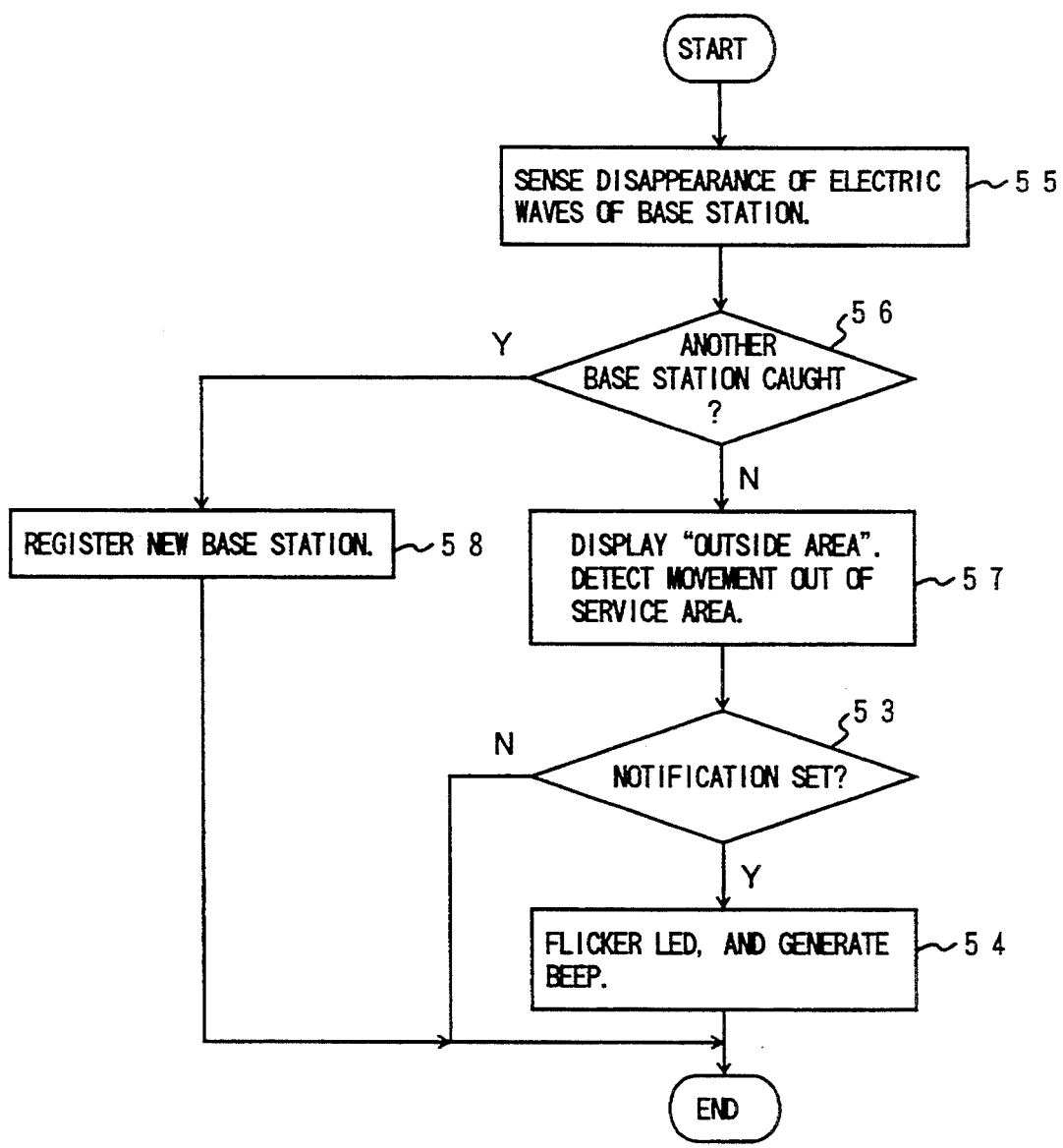
FIG. 3 is a flow chart showing another example of the operation of the first embodiment of the present invention.

The operating example shown in FIG. 2 corresponds to the case where the user is notified of the entry from outside the service area into this service area. It is also possible to notify the user that the telephone terminal has moved out of the service area. FIG. 3 is a flow chart showing an operating example in the case where the user is notified of the movement out of the service area. Now, the operation of the embodiment in this case will be described with reference to FIGS. 1 and 3. When the automobile telephone set has become distant from the base station, electric waves weaken, and the system control signal sent from the base station cannot be normally received. Consequently, the output from the analyzer 7 ceases or disappears (step 55). The main controller 8 responsively controls the radio-frequency signal circuit 2 so as to alter the radio channel to another one and to check if a system control signal sent from another base station is receivable on this new channel (step 56). In a case where the system control signal has been successfully received, the main controller 8 registers the newly picked up base station and ends the processing (step 58). On the other hand, in a case where the system control signal cannot be received on any of radio channels set, the main controller 8 controls the display unit 9 so as to present the display indicative of "outside the service area" (step 57). On this occasion, the detection means of the detection/notification unit 21 detects the state change based on the movement out of the service area. After having presented the display, the main controller 8 checks if the setting unit 10 is set so as to perform the notifying operation of the detection/notification unit 21 (step 53). The routine proceeds to a step 54 when the notifying operation is set, and it is directly ended when not. On condition that the notifying operation is set, the detection/notification unit 21 flickers the LED 22, and it also controls the speech controller 5 so as to emit the notifying sound (beep) from the speaker 13 (step 54). After the end of the above processing, the main controller 8 continues the receiving operation while changing the radio channel until the system control signal becomes receivable, that is, until the output of the analyzer 7 falls into the normal state. Owing to the above operations, when the automobile telephone terminal has missed the base station, not only is the display "OUTSIDE SERVICE AREA" presented, but also the LED 22 is flickered while at the same time, the beep is produced from the speaker 13. Therefore, the operator of the telephone terminal can know the unusability thereof without confirming the display "OUTSIDE SERVICE AREA" on the display unit 9, so that the convenience of the telephone terminal is enhanced.

It is a matter of course that the convenience of the telephone terminal is enhanced more by employing both the operating examples shown in FIGS. 2 and 3. In this case, the aspect of notification can be made different between the case of movement into the service area and the case of movement out of the same, thereby permitting the user to distinguish the movements from each other. Thus, the convenience can be enhanced remarkably. By way of example, it facilitates the distinction by the user that the movement into the service area is chimed by the use of the speaker 13, whereas the movement out of the service area is buzzed. Needless to say, the flickering intervals or lighting-up method of the LED 22 may well be changed for the same purpose.

In the embodiment described above, the beep from the speaker 13 and the flickering of the LED 22 are conjointly utilized as the expedients of the notifications. However, another notifying method may well be adopted, and the notifying methods may well be selectable.

Figure 4:
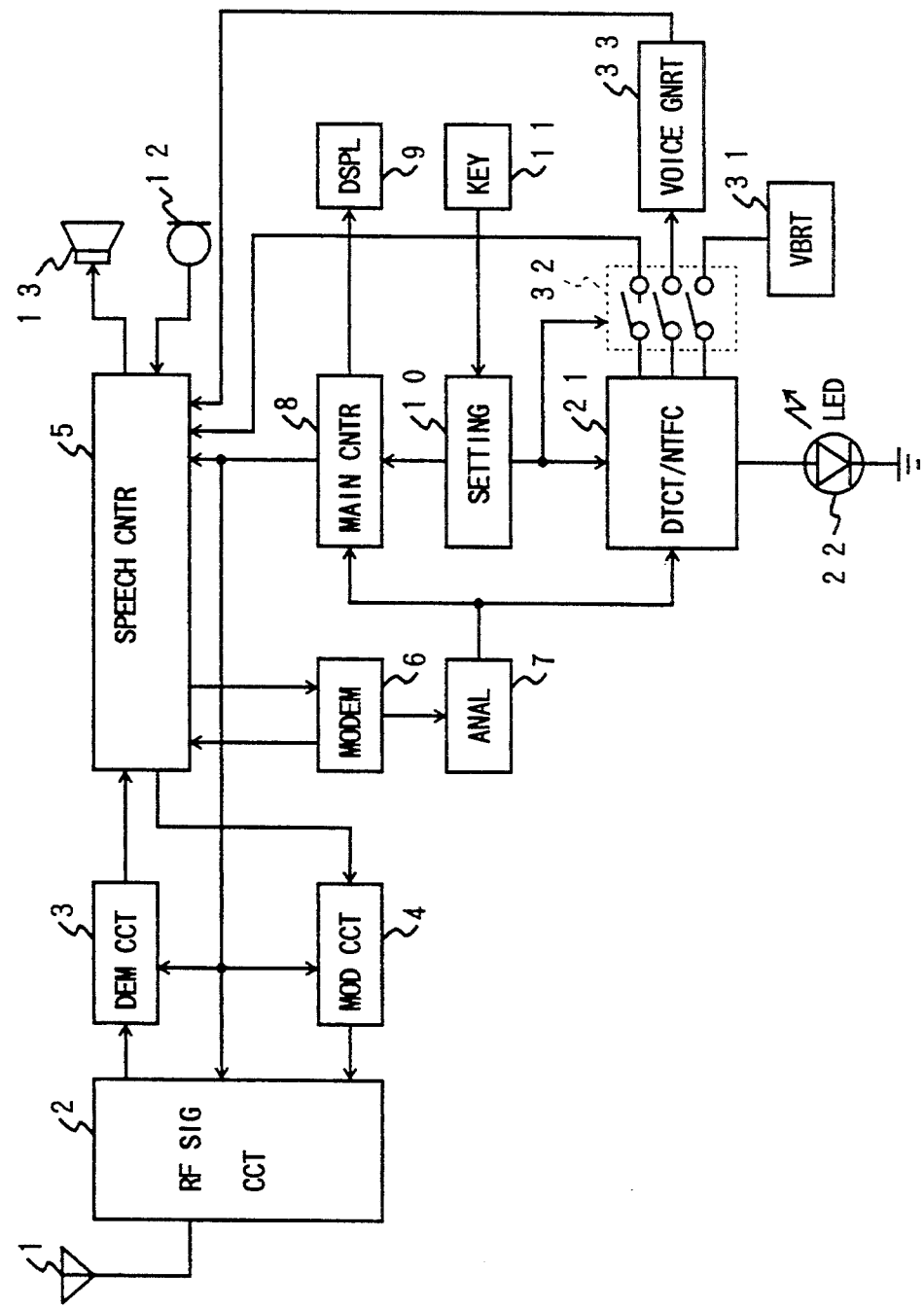
FIG. 4 is a block diagram showing the construction of the second embodiment of the present invention.

FIG. 4 is a block diagram showing the second embodiment of the present invention. The points of difference of this embodiment from the first embodiment shown in FIG. 1 are that notification means can be selected, and that a voice generator 33 is additionally provided in order to use speech as a notifying sound. Referring to FIG. 4, the voice generator 33 serves as message output means, and it produces preset messages in accordance with signals from the detection/notification unit 21. A vibrator 31 as vibration means produces vibrations, thereby notifying the user of the entry of the mobile communications equipment into the service area. Concretely, the vibrator 31 is any vibrators which utilize an electric motor, a piezoelectric vibrator, an electromagnet, etc. A switching circuit 32 operates to select the constituent means of the notification means.

In the embodiment shown in FIG. 4, the notification means includes three sorts of expedients; the production of the message from the voice generator 33 (replacing the production of the beep from the speaker 13 based on controlling the speech controller 5), the flickering of the LED 22, and the production of the vibrations based on the operation of the vibrator 31. These notifying expedients can be selected through the switching circuit 32. Thus, the constituent notification means can be selected and altered by the setting of the setting unit 10 from the keys 11. The operations of the other components are the same as in the embodiment shown in FIG. 1.

Now, the operation of the embodiment shown in FIG. 4 will be described. When the user has moved from outside the service area into this service area, the detection/ notification unit 21 detects the state change on the basis of the change of the output of the analyzer 7. After the detection, the unit 21 performs the notifying operation through the switching circuit 32. Owing to the function of the switching circuit 32, the three sorts of constituent notification means can be selected in accordance with the setting of the setting unit 10.

As described above, according to this embodiment, the constituent means of the notification means can be selected, so that the user can utilize the appropriate constituent means in TPO (time, place, occasion) fashion. By way of example, in a case where the user does not wish for the emission of the sound in the vehicle, he/she can select the notifying expedient based on the vibrations or flickering. Also, in a case where the user is having difficult noticing the state change with only the flickering of the LED 22, he/she can select the notifying expedient based on the vocal message, for example, "The telephone set is usable.", "The telephone set has moved out of the service area." or "The service area has changed.". Therefore, this embodiment has the effect that the user can select the desired setting.

Figure 5:
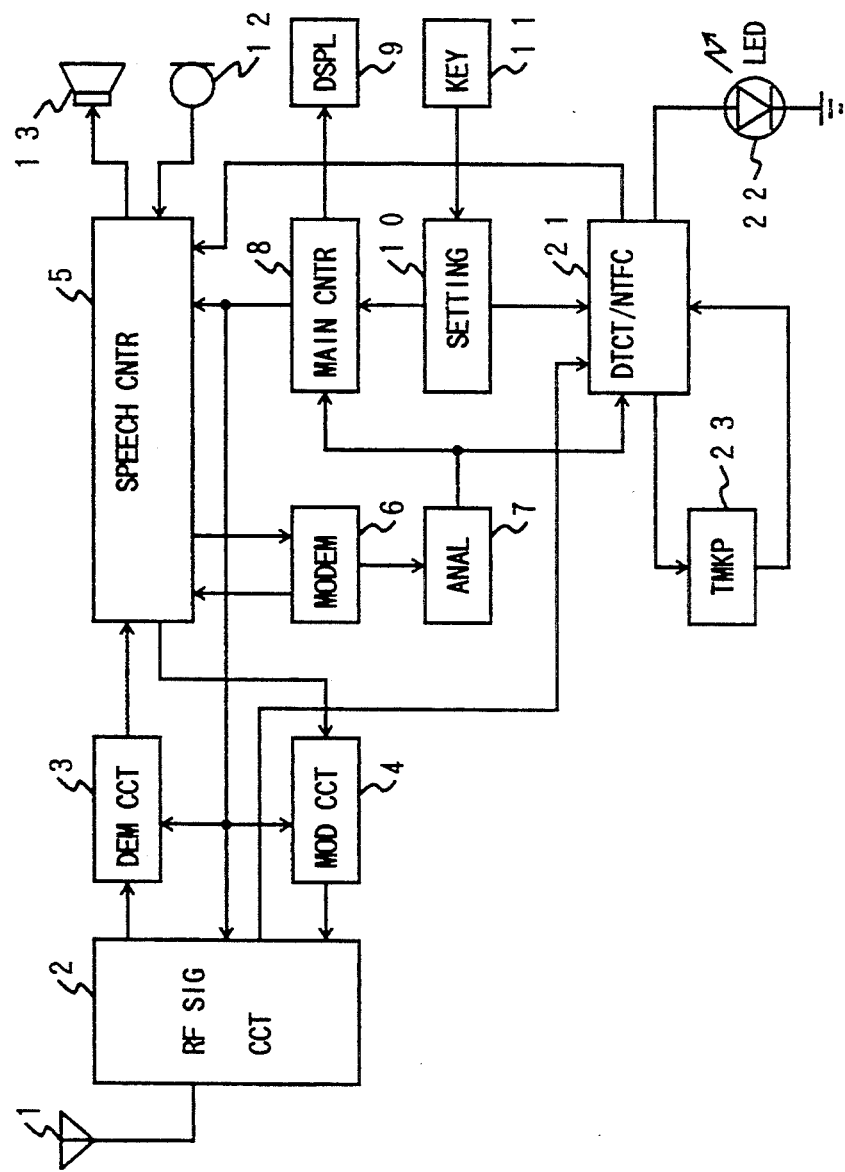
FIG. 5 is a block diagram showing the construction of the third embodiment of the present invention.

In the embodiment described above, the convenience of the telephone terminal is enhanced in the way that the notifying methods are made selectable. However, the effect of the present invention can be intensified when conditions for performing the notifying operation are made selectable. FIG. 5 is a block diagram showing the third embodiment of the present invention. The point of difference of this embodiment from the first embodiment shown in FIG. 1 is that the conditions for performing the notifying operation of the detection/-notification unit 21 are made selectable. Referring to FIG. 5, timekeeping means 23 for measuring an elapsed time period is connected to the detection/notification unit 21, making it possible to alter the timing of performance of the notifying operation. In addition, the radio-frequency signal circuit 2 includes electric field strength detection means for detecting the electric field strength of the received signal. The detection means of the circuit 2 supplies the detection/notification unit 21 with information on the electric field strength of the received signal. Thus, the performance of the notifying operation can be controlled depending upon the strength of the electric field of the received signal. The items of the conditions for the performance of the notifying operation which can be set in the embodiment shown in FIG. 5 are listed in Table 1 below, along with the set contents of the condition items. All the conditions for the performance and the contents can be set by operating the setting unit 10 from the keys 11 which serve as the instruction input means. The user can alter the setting as required.

TABLE 1

| Item of Condition | Set Contents |
| --- | --- |
| 1. Number of Times of Performance | Setting #1: Notifying operation is not performed. |
|  | Setting #2: Performed at first time only. |
|  | Setting #3: Performed at all times. |
| 2. Electric field strength | Setting #1: Performed irrespective of field strength. |
|  | Setting #2: Performed at above predetermined level. |
| 3. Timing of Performance | Setting #1: Performed immediately. |
|  | Setting #2: Performed after lapse of predetermined time. |

In Table 1, the condition item #1 serves to set the number of times of performance of the notifying operation. The nonperformance of the notifying operation can also be selecting by the setting #1 of the set contents. The setting #2 is especially provided as one feature of this embodiment in consideration of the convenience of the communications equipment to the user, and it functions to perform the notifying operation only one time after the user's setting. By way of example, when the user wants to call during the movement aboard the automobile outside the service area, he/she may be notified of the establishment of communicability only once. In this case, the setting #2 causes the notification means to give the notification at the first state change only. Once the notifying operation has been performed, it need not be inhibited, which is convenient to the user. By the way, the number of times of performance in the setting #2 may well be optionally set to 2 or more. Further, the setting #3 makes it possible to give the notification at every state change.

The number of times of performance as the condition item #1 can be stored and controlled within the detection/notification unit 21. It is therefore to be understood that the setting of this condition is also applicable to the embodiments shown in FIG. 1 and FIG. 4.

The condition item #2 of the electric field strength and the condition item #3 of the performance timing are provided in order to verify that the communicable state of the telephone terminal is stable. In general, at the boundary between the interior and exterior of a service area, received electric waves are of low field strength, and they often disappear soon after the telephone terminal has fallen into the communicable state. Particularly in such a case where the telephone terminal cannot help moving along the border part of the service area, the state thereof is frequently changed between the communicable state and the incommunicable state, and the notifying operation might be frequently performed. In such a situation, the condition items 2 and 3 are very effective. The setting #2 of the condition item #2 signifies that the notifying operation is performed when the electric field strength measured by the detection means of the radio-frequency signal circuit 2 has exceeded a certain predetermined level. The conditioned performance can avoid the unstable operation of the telephone terminal attributed to the weak electric field near the border of the service area. Further, with the setting #2 of the condition item #3, the notifying operation is performed when the telephone terminal has been checked by the timekeeper 23 as lying within the service area continually for the predetermined time period, and it can be verified that the telephone terminal has fully entered the service area. By way of example, in a case where the telephone terminal moves in a mountainous district which is topographically complicated, the propagation of electric waves changes complexly, and hence, the electric field strength thereof can change suddenly in a short time. In this case, it is effective to utilize that combination of the setting #2 of the condition item #2 and the setting #2 of the condition item #3 in which the stable maintenance of the communicable state for the predetermined time period is detected in terms of the electric field strength.

Figure 7:
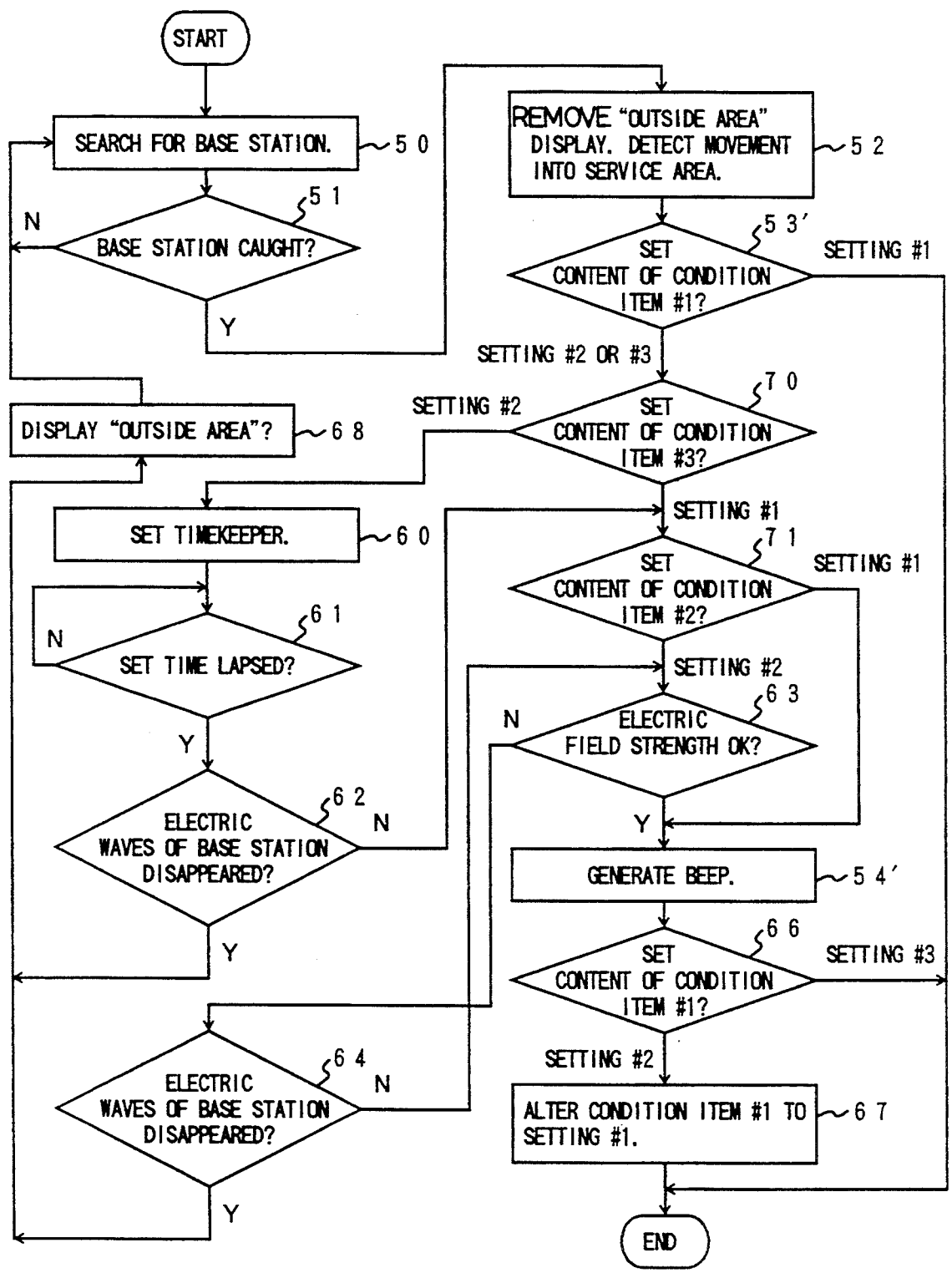
FIG. 7 is a flow chart showing another example of the operation of the third embodiment of the present invention.

Now, the operation of the third embodiment shown in FIG. 5 will be detailed in conjunction with FIG. 6 or FIG. 7. FIG. 6 is a flow chart showing an example of the operation in the case where the condition items #2 and #3 of the condition items listed in Table 1 are fixedly set beforehand. On the other hand, FIG. 7 is a flow chart showing another example of the operation in the case where the user can set all the condition items listed in Table 1.

First, reference will be made to FIGS. 5 and 6. As stated before, when the automobile telephone terminal has missed the service area, it becomes incapable of receiving the system control signal sent from the base station. Under this state of the telephone terminal, the main controller 8 controls the display unit 9 so as to present the display "OUTSIDE SERVICE AREA". Thereafter, it changes the radio channel in order to search for a new base station (step 50). When the system control signal has been received during the search operation, the content thereof is analyzed by the analyzer 7 to decide whether or not the signal is the system control signal of a new base station (step 51). When the new base station is not received, the main controller 8 changes the radio channel, and the routine returns to the step 50. In a case where the system control signal has been received to pick up the new base station, the display "OUTSIDE SERVICE AREA" presented on the display unit 9 is removed (step 52). The analyzed result of the analyzer 7 is also supplied to the detection/notification unit 21, in which the pick up of the base station is detected. Subsequently, the detection/notification unit 21 checks the setting of the condition item #1 (step 53'). That is, at the step 53', the condition item #1 indicated in Table 1 is checked to decide how the operation of the detection/notification unit 21 is set. When the condition item #1 is set at the setting #2 or #3, the routine proceeds to a step 60, and when the condition item #1 is set at the setting #1, the routine is directly ended. At the setting #2 or #3, the timekeeper 23 is set or is started timekeeping (step 60). Thereafter, if the electric waves of the base station can be stably received for the preset time period is checked at steps 61 and 62. When the electric waves of the base station have disappeared (step 62), it is decided that the service area has been missed, and the display "OUTSIDE SERVICE AREA" is presented (step 68). Thereafter, the routine returns to the step 50. When the detection/notification unit 21 has detected the lapse of the preset time period from the output signal of the timekeeper 23, the step 61 is followed by a step 63. Here, the detection/notification unit 21 checks the received electric field strength on the basis of the electric field strength information supplied from the radio-frequency signal circuit 2. As long as the electric field strength is at the preset level or below, the step 63 and a step 64 are iterated. Meantime, when the electric waves of the base station have disappeared (step 64), resulting in the decision that the service area has been missed, the display "OUTSIDE SERVICE AREA" is presented (step 68), and the routine returns to the step 50. When the electric field strength exceeds the preset level, the step 63 is followed by a step 54'. At this step 54', the detection/notification unit 21 flickers the LED 22, and it controls the speech controller 5 so as to emit the beep from the speaker 13. Thereafter, the condition item #1 indicated in Table 1 is checked (step 66). When the set content of the condition item #1 is the setting #2, the notifying operation ought to be performed only once. Therefore, the set content is altered to the setting #1 (step 67) so as not to perform the notifying operation again.

Owing to the above operations, also in this embodiment, when the automobile telephone terminal has picked up the new base station, not only is the display "OUTSIDE SERVICE AREA" is removed, but also the LED 22 is flickered while at the same time, the beep is produced from the speaker 13. Therefore, the operator of the telephone terminal can know the usability thereof without confirming the removal of the display "OUTSIDE SERVICE AREA" from the display unit 9, so that the convenience of the telephone terminal is enhanced. Further, since the number of times of performance, the electric field strength and the performance timing are added as the conditions for giving the notification, this embodiment is effective to enhance the stability of the operation of the telephone terminal.

Next, the operation will be described with reference to FIGS. 5 and 7. The operation shown in FIG. 7 differs from the above operation shown in FIG. 6 in that the user can also set the condition items #2 and #3 freely. When the telephone terminal has moved out of the service area, the main controller 8 controls the display unit 9 so as to present the display "OUTSIDE SERVICE AREA". Thereafter, it changes the radio channel in order to search for a new base station (step 50). When the system control signal has been received during the search operation, the content thereof is analyzed by the analyzer 7 to decide whether or not the signal is the system control signal of a new base station (step 51). When the signal is not the system control signal of the new base station, the main controller 8 changes the radio channel, and the routine returns to the step 50. In a case where the system control signal has been received to pick up the new base station, the display "OUTSIDE SERVICE AREA" presented on the display unit 9 is removed (step 52). The analyzed result of the analyzer 7 is also supplied to the detection/notification unit 21, which detects the picking up of the base station or the state change. In accordance with the state change, the detection/notification unit 21 checks the condition item #1 in Table 1 (step 53') as to how the notifying operation thereof is set. When the condition item #1 is set at the setting #2 or #3, the routine proceeds to a step 70, and when the condition item #1 is set at the setting #1, the routine is directly ended. At the setting #2 or #3 of the condition item #1, the condition item #3 is checked (step 70). The step 70 is directly followed by a step 71 subject to the setting #1 of the condition item #3, and it is followed by steps 60 et seq. subject to the setting #2 of the condition item #3. The timekeeper 23 is operated to check if the electric waves of the base station can be stably received for the preset time (steps 60–62). The processing of these steps 60~62 is the same as in the example illustrated in FIG. 6. At the step 71, the condition item #2 is checked. The step 71 is directly followed by a step 54' subject to the setting #1 of the condition item #2, and it is followed by steps 63 et seq. subject to the setting #2. As long as the electric field strength of the received electric waves is at the preset level or below, the steps 63 and 64 are iterated. The processing of these steps 63 and 64 is the same as in FIG. 6. When the electric field strength has been OK'd in excess of the preset level, the detection/notification unit 21 flickers the LED 22, and it controls the speech controller 5 so as to emit the beep from the speaker 13 (step 54'). Thereafter, the condition item #1 indicated in Table 1 is checked (step 66). When the set content of the condition item #1 is the setting #2, the notifying operation ought to be performed only once. Therefore, the set content is altered to the setting #1 (step 67) so as not to perform the notifying operation again.

Owing to the above operations, also in this embodiment, when the automobile telephone terminal has picked up the new base station, not only is the display "OUTSIDE SERVICE AREA" removed, but also the LED 22 is flickered while at the same time, the beep is produced from the speaker 13. Therefore, the operator can know the usability of the telephone set without confirming the disappearance of the display "OUTSIDE SERVICE AREA" on the display unit 9, so that the convenience of the telephone terminal is enhanced. Further, the checks of the number of times of performance, the electric field strength and the continuity of the state are added as the conditions for giving the notification. Accordingly, this embodiment brings forth the effect that the stability of the operation of the telephone terminal can be enhanced, and the effect that the user can alter the set conditions more conveniently as demands.

In the embodiments thus far described, the automobile telephone sets have been referred to. It is to be understood, however, that the present invention is applicable to any mobile communications terminal comprising analysis means for analyzing electric waves sent from a base station, detection means for detecting if the terminal lies within a service area, from the analyzed result of the analysis means, and notification means for giving notification to the user of the terminal in response to the output of the detection means. That is, the present invention is effective for any of the terminals of systems wherein a radio communications channel is established between the mobile terminal and a relay station or an exchange which is installed on the ground or in a satellite. Concrete examples of the terminals are an MCA (multichannel access) terminal, a second-generation cordless telephone set and a digital cellular terminal which have certain limited service areas.

Figure 8:
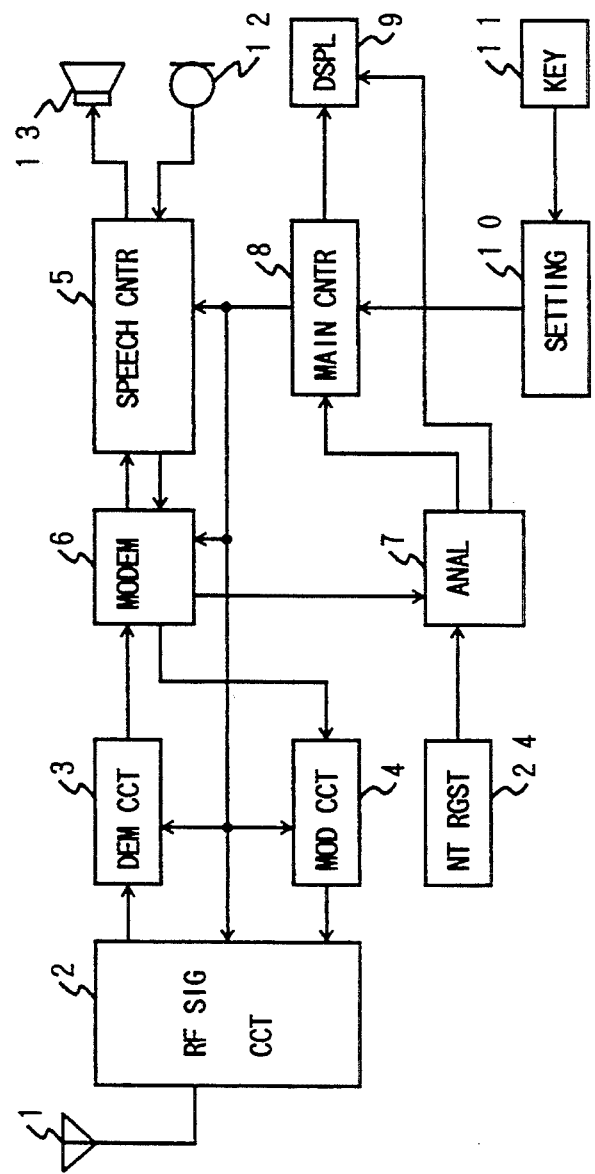
FIG. 8 is a block diagram showing the construction of the fourth embodiment of the present invention.

FIG. 8 is a block diagram showing an example of a digital mobile communications terminal which transmits all speech and data in terms of digital signals. Referring to FIG. 8, the communications equipment in this embodiment comprises an antenna 1, and a radio-frequency signal circuit 2 which receives a signal sent from another equipment and transmits a signal directed toward the other equipment and which processes the radio-frequency signals. A demodulation circuit 3 detects the received signal synchronously, while a modulation circuit 4 modulates the signal to-be-transmitted orthogonally. A modem circuit 6 demodulates the synchronously-detected signal into digital data. The modem circuit 6 also functions to correct errors and to convert digital data into the orthogonal signal to-be-transmitted. A speech controller 5 quantizes the speech signal received or to-be-transmitted, and also performs the processing of data compression/expansion, the generation of a ringing tone or a warning sound, the control of a speech route, etc. An analyzer 7 serves as analysis means for analyzing whether or not the communications of the pertinent equipment with the other equipment are possible. A main controller 8 controls the operation of the whole equipment functioning as an automobile telephone set. Display means 9 is, for example, a display unit made of liquid crystal or the like. It displays the data of a dialing input and the state of the automobile telephone set proper. Shown at numeral 11 is a key circuit which serves as an instruction input unit, and which accepts key inputs for the dialing, etc. A setting unit 10 which serves as setting means analyzes the depressions of the keys 11, and delivers a set content to the main controller 8. A microphone 12 and a speaker 13 constitute input/output means, herein the handset of the telephone set. The microphone 12 accepts an external signal, or converts the voice signal into an electric signal. On the other hand, the speaker 13 converts the signal demodulated by the demodulation circuit 3, into a voice signal which is externally emitted. The construction explained above is similar to the main construction of a digital mobile communications terminal in the prior art. In this embodiment, the automobile telephone set is additionally provided with a network registration unit 24. The network registration unit 24 is a component in which the sorts of serviceable or available networks are registered. Table 2 below indicates examples of the registered sorts of networks. Referring to Table 2, Network #1 is a communications network or circuit through which the pertinent equipment communicates with a preset host station as in a cordless telephone system, Network #2 is a personal network or circuit which is individually provided for private communications, Network #3 is a public radio network which has been individually subscribed to with a network offerer, Network #4 is another public radio network which is usable, and Network #5 is a special network such as a satellite circuit which is usable through a satellite or an emergency circuit which is opened in case of emergency. Whether or not any of the networks is usable, is decided in such a way that the analyzer 7 analyzes the output system control data of the modem 6 while comparing it with the registered contents of the network registration unit 24.

TABLE 2

| Network No. | Name of Network | Remarks |
|---|---|---|
| Network #1 | Base circuit | Connected with specified host station. |
| Network #2 | Personal circuit | Individual network such as private radio system. |
| Network #3 | Subscriber network | Public network subscribed to. |
| Network #4 | Roaming network | Another public network. |
| Network #5 | Special network | Satellite link, emergency circuit, or the like. |

Figure 12:
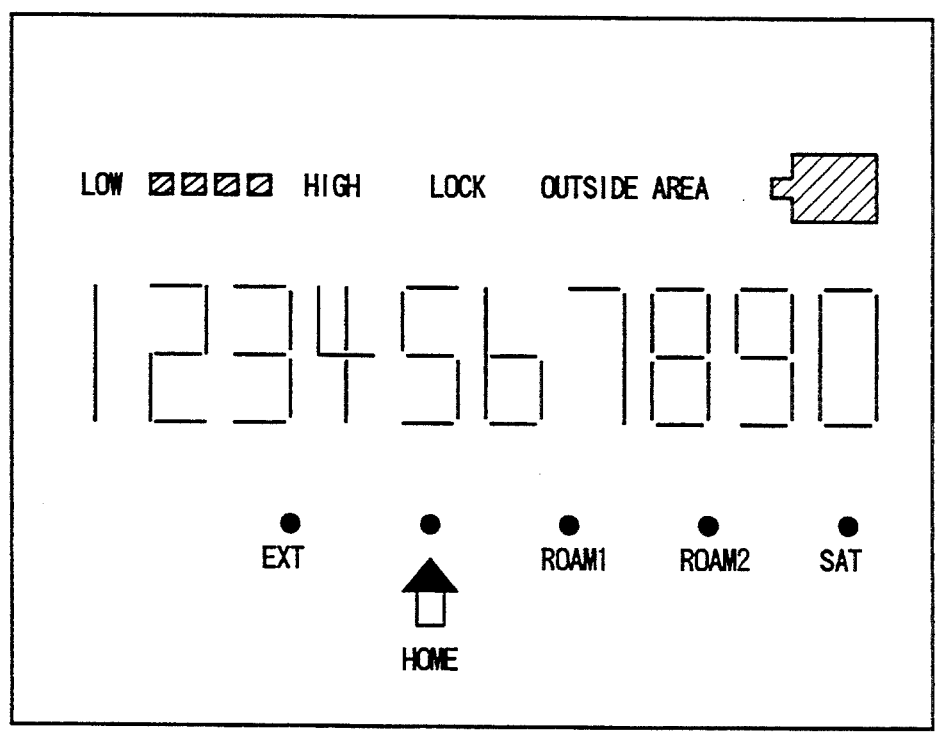
FIG. 12 is a diagram showing an example of display.

Now, the operation of the embodiment shown in FIG. 8 will be described. Among electric waves received by the antenna 1, only the signal of a specified frequency ("radio channel") is selected and amplified by the radio-frequency signal circuit 2. The received signal is subjected to the synchronous detection by the demodulation circuit 3, and the detected signal is supplied to the modem 6. The modem 6 demodulates the input signal into the digital data, the speech data of which is delivered to the speech controller 5 and the system control signal of which is delivered to 5 the analyzer 7 and has its content analyzed. Here, the system control data is continually sent from the host station or a transponder, and it contains peculiar recognition data or classification code data so as to distinguish the sort of the corresponding network. The analyzer 7 decides whether or not the network is usable, by analyzing the system control data in comparison with the registered contents of the network registration unit 24, and it delivers the analyzed result to the main controller 8 as well as the display unit 9. The main controller 8 controls the operation of the whole automobile telephone set on the basis of the analyzed result of the analyzer 7. The speech data is subjected to the data expansion and then converted into an analog signal by the speech controller 5, and the analog signal is converted into a voice signal by the speaker 13. The analyzed result of the analyzer 7 is also supplied to the display unit 9 so as to display the sort of the usable network. FIG. 12 shows an example of the display of the display unit 9. The sorts of networks as listed in Table 2 are indicated as shown in the lower part of FIG. 12, and the lamps of the usable networks are lit up or flickered. Besides, the electric field strength of the received signal and the display "OUTSIDE SERVICE AREA" may well be displayed as shown in the upper part of FIG. 12.

Likewise to any of the foregoing embodiments, the embodiment shown in FIG. 8 may well be provided with detection/notification means including detection means and notification means. In this case, the analyzer 7 decides the sort of the communicable network from the signal received by the radio-frequency signal circuit 2. The detection means detects the change of the sort of the communicable network from the analyzed result of the analyzer 7. The notification means notifies the user of the telephone set that the sort of the network has changed, in response to the detection of the detection means.

Alternatively, the analyzer 7 analyzes the communicable networks from the signals received by the radio-frequency signal circuit 2, with reference to the network registration unit 24. The detection means detects the state changes of the respective networks between the communicable and incommunicable states thereof, on the basis of the analyzed results of the analyzer 7. The notification means notifies the user of the state changes of the respective networks detected by the detection means.

These contrivances bring forth the effect that the user can confirm the used network.

Figure 9:
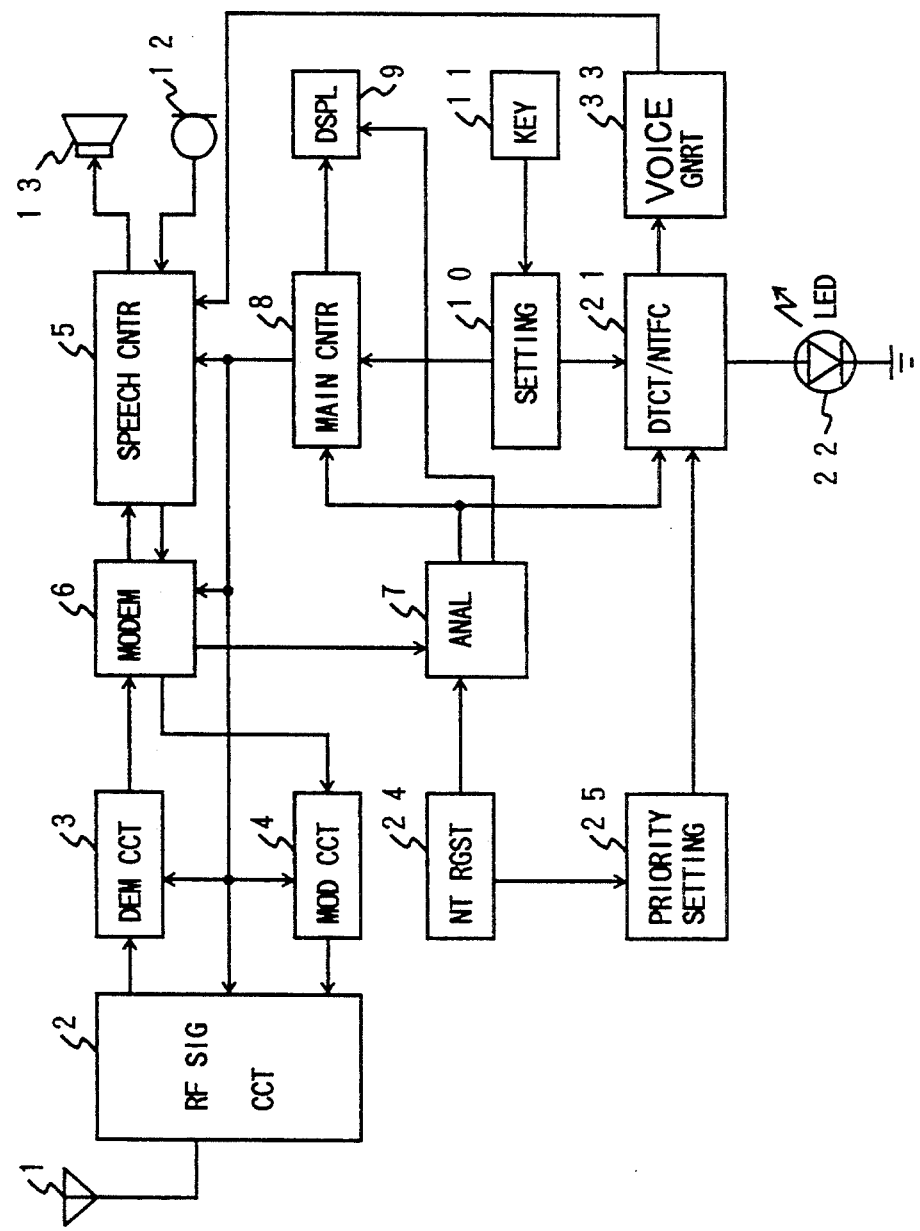
FIG. 9 is a block diagram showing the construction of the fifth embodiment of the present invention.

FIG. 9 is a block diagram showing the second example of the digital mobile communications terminal. The point of difference of this embodiment from the embodiment shown in FIG. 8 is that a detection/notification unit 21, an LED 22, a voice generator 33 and a priority setting unit 25 are additionally provided, whereupon when a network set in the setting unit 10 has become usable, the detection/ notification unit 21 notifies the user of the communicability by the flickering of the LED 22 or/and the output message of the voice generator 33. Referring to FIG. 9, the priority setting unit 25 sets priority levels for the networks registered in the network registration unit 24, and it selects the required one of the networks in conformity with the setting. The detection/notification unit 21 detects if the network selected by the priority setting unit 25 has fallen into a communicable or incommunicable state, from the change of the analyzed result of the analyzer 7, and it notifies the user of the state change. In other words, the detection/notification unit 21 includes detection means for detecting the change between the communicable and incommunicable states of the network selected by the priority setting unit 25, on the basis of the analyzed result of the analyzer 7, and notification means for notifying the user of the state change detected by the detection means. The voice generator 33 produces any necessary preset messages in accordance with the output signal of the detection/ notification unit 21. This voice generator 33 forms part of message output means, and the vocal message is emitted by the speaker 13. The operations of the other components are the same as in the embodiment shown in FIG. 8.

The embodiment shown in FIG. 9 operates as described below. The detection/notification unit 21 can decide whether or not the network registered in the network registration unit 24 lies within a service area, from the analyzed result of the analyzer 7. By way of example, in a case where the digital mobile communications terminal has moved out of the service area, the system control signal sent from the host station or the base station cannot be normally received, and hence, the output from the analyzer 7 ceases or disappears. Further, when the sort of the connectable network has changed, the peculiar recognition data or classification code data for discriminating the sort of the network as contained in the system control data changes, so that the detection/notification unit 21 can know the change of the network from the change of the output of the analyzer 7. When the output of the analyzer 7 has ceased, the main controller 8 controls the radio-frequency signal circuit 2 so as to alter the radio channel to another one and to check if a system control signal sent from another base station is receivable. In a case where the system control signal cannot be picked up on any of the radio channels set, the main controller 8 controls the display unit 9 so as to present the display indicative of "outside the service area". Even after the display has been presented, the main controller 8 continues the receiving operation while changing the radio channel until the system control signal becomes receivable, that is, until the output of the analyzer 7 falls into the normal state. In the situation where the communicable radio channel is being searched for, the digital automobile telephone set is capable of neither call origination nor call termination. Therefore, even when the user depresses the keys 11, the main controller 8 operates to hinder the transmitting operation. In due course, when the system control signal of any of the networks registered in the network registration unit 24 has been normally received, the analyzer 7 supplies the main controller 8 with the analyzed result. The main controller 8 responsively controls the display unit 9 so as to remove the display "OUTSIDE SERVICE AREA". Thenceforth, the digital automobile telephone set is capable of both call origination and call termination. In this embodiment, the output of the analyzer 7 and that of the priority setting unit 25 are supplied to the detection/notification controller 21, whereby the detection/notification controller 21 decides whether or not the network selected by the priority setting unit 25 is usable. As the result of the decision, the detection/notification controller 21 can flicker the LED 22 or/and emit the notifying message through the control of the voice generator 33, to notify the user that the digital mobile communications equipment has become communicable or incommunicable or that the usable network has changed. The user can set the operation of the detection/notification unit 21 via the setting unit 10 with the keys 11. In this embodiment, whether or not the notifying operation is to be performed can be set.

Figure 10:
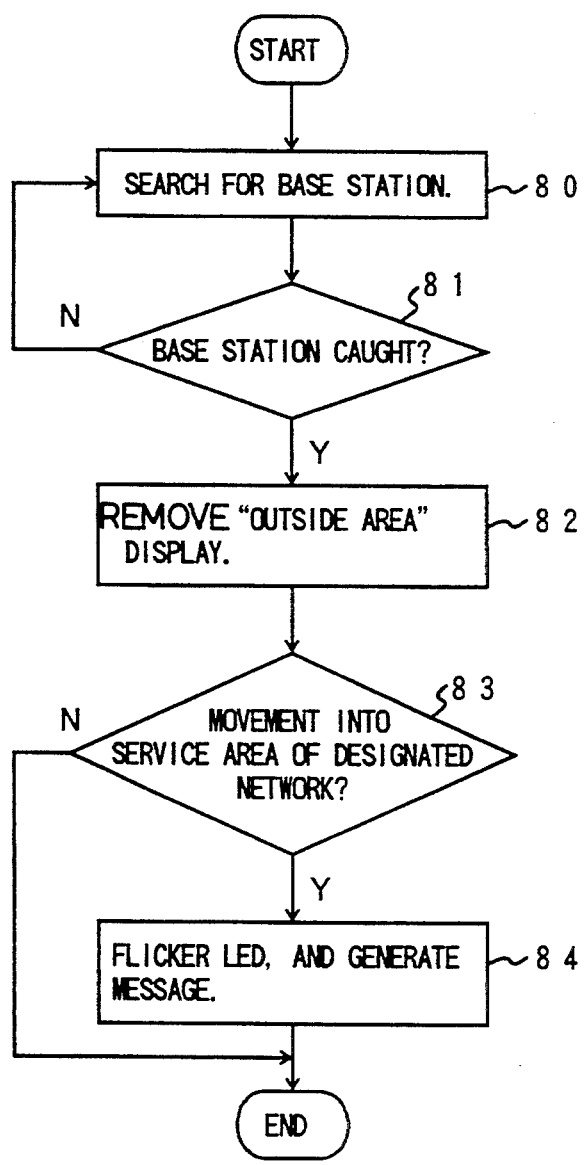
FIG. 10 is a flow chart showing the operation of the fifth embodiment of the present invention.

Now, the operation of the embodiment shown in FIG. 9 will be described in detail with reference to FIGS. 9 and 10. FIG. 10 is a flow chart showing the operation of this embodiment.

As stated before, when the digital mobile communications terminal has missed the service area, the system control signal sent from the base station fails to be received. Under this state of the communications terminal, the main controller 8 controls the display unit 9 so as to present the display "OUTSIDE SERVICE AREA" Thereafter, it changes the radio channel in order to search for a new base station (step 80). When the system control signal has been received during the search operation, the content of the received signal is analyzed by the analyzer 7, to decide if the signal is the system control signal of the new base station (step 81). When the received signal is not the system control signal of the new base station, the main controller 8 changes the radio channel, and the routine returns to the step 80. In a case where the system control signal has been received to pick up the new base station, the display "OUTSIDE SERVICE AREA" presented on the display unit 9 is removed (step 82). The operations thus far explained are the same as in the prior-art automobile telephone terminal. In this embodiment, when the analyzed result of the analyzer 7 indicates the picking up of the base station, it is also delivered to the detection/notification controller 21. The detection/notification controller 21 is supplied with the analyzed result of the analyzer 7 and the output of the priority setting unit 25, and it decides whether or not the network selected by the priority setting unit 25 has become usable (step 83). When the decision indicates the usability of the selected network, the detection/notification controller 21 flickers the LED 22, and it also controls the voice generator 33 so as to emit the notifying message from the speaker 13 (step 84), thereby notifying the user of the state change into the communicable state. Alternatively, the detection/notification controller 21 may include vibration means so as to give the notification in terms of vibrations. It may well include sound output means so as to give the notification in terms of a notifying sound (beep). Likewise to the foregoing embodiments, this embodiment may well be so contrived that the constituent means of the notification means to be used for the notification can be selectively set.

These operations make it possible to register predetermined sorts of networks, to endow the sorts of networks with priority levels, to analyze whether or not the network of higher priority level is communicable, to detect the state change of the network of higher priority level from the incommunicable state of this network into the communicable state thereof, and to give notification in response to the state change of the network of higher priority level.

Owing to the above operational features, when the digital mobile communications terminal has picked up the network set in the priority setting unit 25 before-hand, the LED 22 is flickered while at the same time, the notifying message is produced from the speaker 13. Therefore, the operator of the telephone terminal can know the usability thereof without confirming the disappearance of the display "OUTSIDE SERVICE AREA" or the appearance of a display indicative of the usability of the network on the display unit 9, so that the convenience of the telephone terminal is enhanced. Especially in a case where the action of seeing the display unit 9 is, in itself, dangerous as in the case of driving an automobile in which the telephone terminal is installed, this embodiment is effective to enhance the driving safety.

The operating example shown in FIG. 10 corresponds to the case where the user is notified of the entry from outside the service area into this service area. The user can also be notified of the movement of the telephone terminal out of the service area as in the embodiment shown in FIG. 3, with ease in such a way that the detection/ notification unit 21 detects the outward movement on the basis of the output of the analyzer 7.

As described above, according to this embodiment, the control signal of the network selected by the user is analyzed to decide that the selected network has fallen into the usable or unusable state, and the LED 22 is flickered while at the same time, the notifying message is emitted from the speaker 13. Therefore, the operator can know the state change of the selected network into the usable or unusable state without seeing the display of the display unit 9, so the convenience of the telephone terminal is enhanced. In particular, since the user can be notified of the state change as to the selected sort of network, this embodiment is favorable in the case of, for example, selecting a network of lower charge rate such as the personal circuit. Moreover, in the present invention, the notifying operation is controlled on the basis of the result obtained by analyzing the system control signal. Therefore, notification can also be given when the content of the system control information has changed. By way of example, in a system in which the system control information contains data indicative of a region where an earth station is located, the region where the telephone terminal is moving may well be decided and then notified to the user. In this case, when the telephone terminal is furnished with calculation means for calculating a communications toll from the regional data, the detection/notification unit 21 can detect and notify the user, for example, that the communications toll has become within a designated amount of money. Of course, this embodiment is also effective to enhance the safety in the case where the action of seeing the display unit 9 is, in itself, dangerous as in the case of driving the automobile. Besides, in this case, the convenience can be more enhanced in such a way that the aspect of notification is made different between at the case of movement into the service area and the case of movement out of the same, thereby permitting the user to distinguish the movements from each other. By way of example, it facilitates the distinction by the user that the movement into the service area is notified by emitting a message "The telephone terminal is usable." from the speaker 13, whereas the movement out of the service area is notified by emitting a message "The service area has been left". Needless to say, the flickering intervals or lighting-up method of the LED 22 may well be changed for the same purpose.

Figure 11:
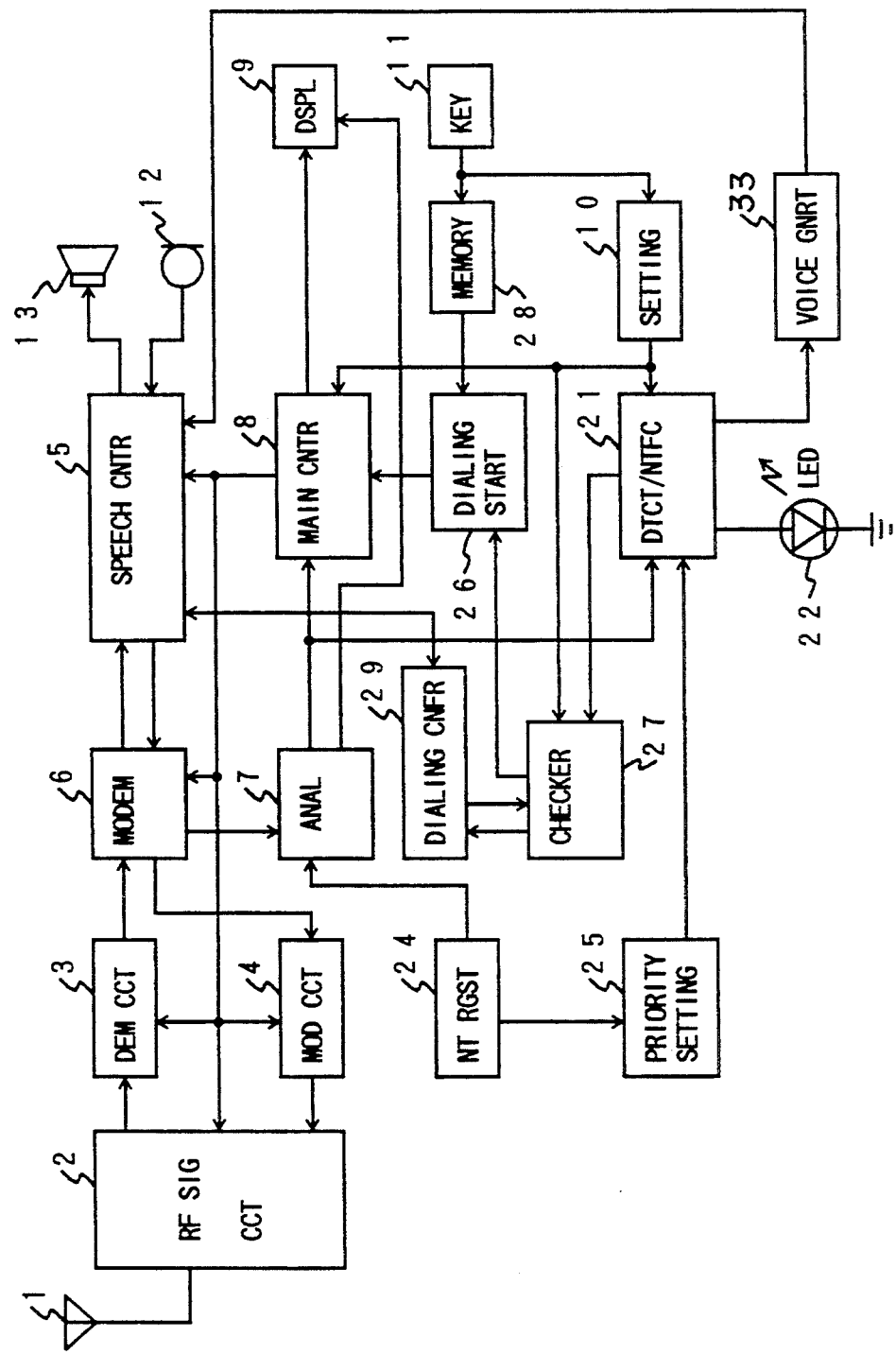
FIG. 11 is a block diagram showing the sixth embodiment of the present invent ion.

In any of the foregoing embodiments, when the communications terminal has moved into or/and out of the service area, only notification of the fact is given. However, another operation may well be performed at the same time. FIG. 11 is a block diagram showing an embodiment of a digital mobile communications terminal which automatically performs a dialing operation at the time of entry into the service area. As compared with the embodiment shown in FIG. 9, the embodiment shown in FIG. 11 is additionally provided with a dialing starter 26, a checker 27, a memory 28 and a dialing confirmation unit 29. The other components are the same as in FIG. 9. Referring to FIG. 11, the memory 28 stores therein the telephone No. or recognition No. of an opposite party to-be-dialed. The dialing starter 26 works on the main controller 8 so as to dial the opposite party stored in the memory 28. The checker 27 checks the operating conditions of the dialing starter 26. More specifically, it checks the conditions from the detected result of the detection/notification unit 21 and the setting of the setting unit 10 so as to operate the dialing starter 26 when the conditions are met. The dialing confirmation unit 29 is started by the checker 27 in accordance with the setting of the setting unit 10. This unit 29 emits a vocal message so as to ask the user whether or not the dialing operation is to be performed. It receives the reply of the user in terms of data afforded by depressing the keys 11 or a voice afforded through the microphone 12 as well as the speech controller 5, and delivers the confirmed result to the checker 27.

The embodiment shown in FIG. 11 operates as described below. When the mobile communications terminal having initially moved out of the service area re-enters the service area, the system control signal becomes receivable, and the analyzer 7 delivers the analyzed result to the main controller 8 as well as the detection/notification unit 21. Upon receiving the analyzed result, the detection/notification unit 21 checks the usability of one of the networks registered in the network registration unit 24 as selected by the priority setting unit 25. When the unit 21 decides the selected network to be usable as the result of the check, it notifies the user of the communicability by flickering the LED 22 or/and emitting the notifying message from the speaker 13 through the control of the voice generator 33. The operations thus far explained are the same as in the embodiment shown in FIG. 9. Upon detecting that the network selected by the priority setting unit 25 has become usable, the detection/notification unit 21 delivers the detected result to the checker 27. The checker 27 responsively checks the conditions set in the setting unit 10. The conditions to be set in the setting unit 10 are whether or not a hands-free function is to be implemented, whether the user's reply is to be the key input or the vocal answer, and so forth. Here in this embodiment, it is possible to set whether or not the autodialing operation is to be performed, and whether or not the dialing operation is to be confirmed by the user. The checker 27 starts the dialing confirmation means 29 subject to the set conditions of the setting unit 10 that the autodialing operation is to be performed and that the dialing operation is to be confirmed by the user. The dialing confirmation means 29 responsively emits the message, for example, "May ... be called?", thereby requesting the user to confirm the dialing. When the user has depressed the keys 11 or replied vocally as the confirmation, the dialing confirmation means 29 delivers the confirmed result to the checkdr 27. Then, the checker 27 supplies a start signal to the dialing starter 26, which works on the main controller 8 so as to start the dialing operation.

As stated above, according to this embodiment, the desired opposite party is automatically dialed at the entry of the telephone terminal into the service area by merely setting the telephone No. or recognition No. of the opposite party in the memory 28 and the condition of the performance of the autodialing operation in the setting unit 10 beforehand during the movement of the telephone terminal in an incommunicable region. Therefore, this embodiment is effective to enhance the convenience of the telephone terminal. Moreover, since the confirmation of the dialing operation can be set, the performance of any unfavorable dialing can be prevented in, for example, a case or a place where the user cannot call. Especially when the hands-free function is conjointly utilized, the confirming operation and the keying operation can be dispensed with during the driving of the automobile in which the telephone terminal is installed. Therefore, this embodiment is effective to enhance driving safety.

Incidentally, the autodialing function included in this embodiment is also applicable to the foregoing embodiments shown in FIG. 1, FIG. 4 and FIG. 5. More specifically, the autodialing function can be realized in each of the foregoing embodiments in the following way: The key circuit 11 is adapted to further accept the identification information of the other equipment to communicate, and an instruction for commencing the communications. Besides, each foregoing embodiment is further provided with a memory which stores the identification information therein, a starter which starts the commencement of the communications in accordance with the identification information stored in the memory, and a checker which commands the starter to start the communications commencement in response to the state change from the incommunicable state into the communicable state as detected by the detection means, on condition that the communications commencement instruction has been accepted by the key circuit 11 in the incommunicable state.

In any of the above embodiments, the notifying operation is performed in the mobile communications equipment proper. It is also possible, however, for detection information to be output from the mobile communications equipment and for a peripheral equipment connected to the mobile communications equipment to perform a notifying operation on the basis of the detection information. In this case, the notifying operation can be performed by a function included in the peripheral equipment. By way of example, in a case where a TV (television) set is mounted as the peripheral equipment, a TV screen can be flickered. Besides, in a case where a FAX (facsimile) equipment is mounted, it can be started. Further, in a case where a car stereo is mounted, a notifying sound (beep), a vocal message or the like can be emitted from the car stereo. The mounted peripheral equipment realizes a notifying method which cannot be performed by only the mobile communications equipment proper. Now, there will be described a mobile communications system in the case where such a peripheral equipment is mounted.

Figure 13:
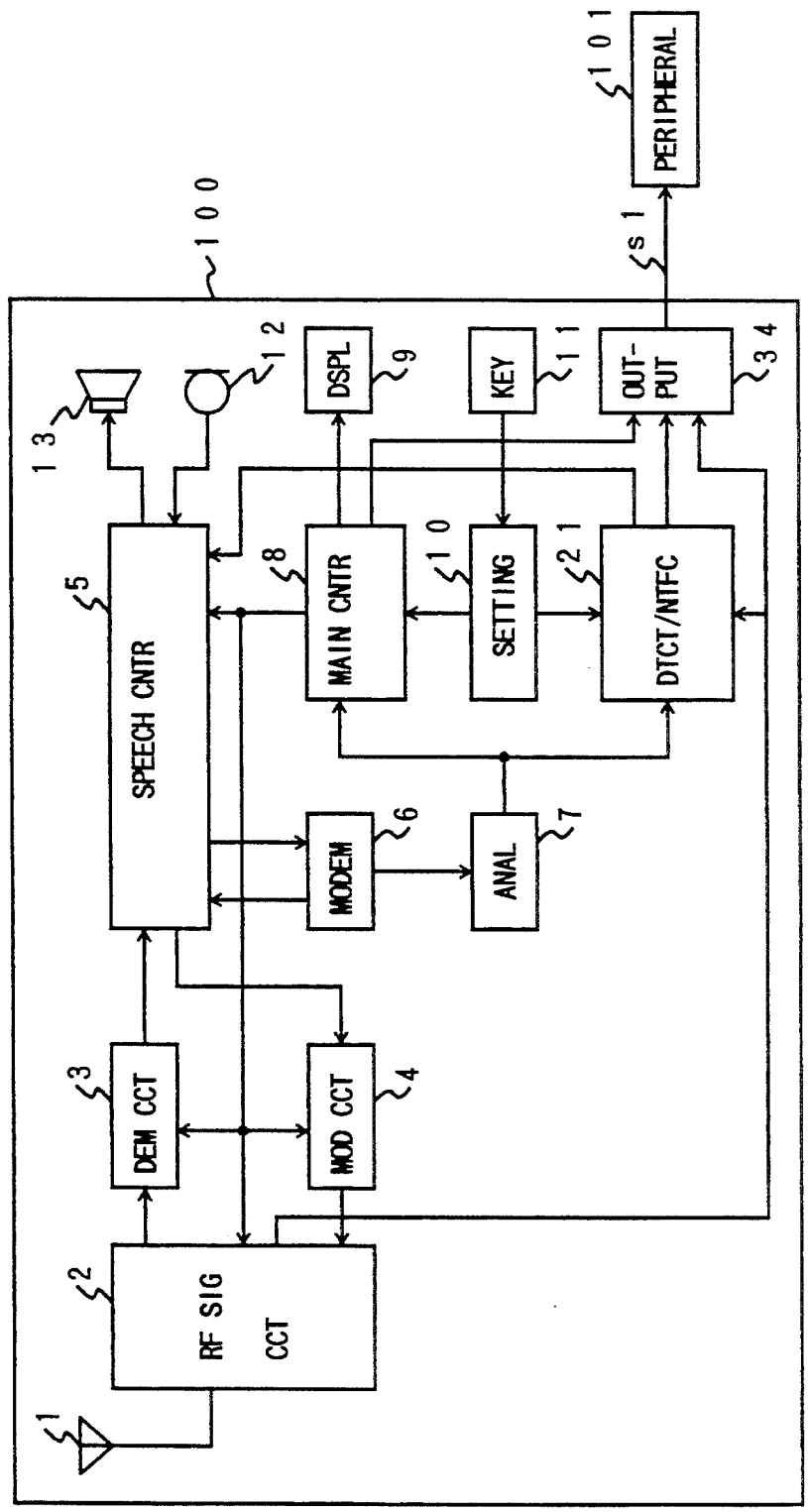
FIG. 13 is a block diagram showing the seventh embodiment of the present invention.

FIG. 13 is a block diagram showing an example in which the peripheral equipment is connected to the mobile communications terminal. Referring to the figure, numeral 100 indicates the mobile terminal. The peripheral equipment 101 connected to the mobile terminal 100 can give notification to the user. Examples of the peripheral equipment are a navigation equipment, a car TV set, a portable TV set, etc. each of which has a display function, and the car stereo, a headphone stereo, a tape recorder, a hearing aid, etc. each of which has a sounding function. The mobile terminal 100 is constructed substantially similarly to the embodiment shown in FIG. 1, and identical numerals are respectively assigned to the blocks of the terminal 100 having the same operations as in FIG. 1. This embodiment shown in FIG. 13 differs from the embodiment shown in FIG. 1 in that an output unit 34 is added and has its output connected to the peripheral equipment 101. The output unit 34 receives at least one piece of information among control information for controlling the peripheral equipment 101 as delivered from the main controller 8, electric field strength information delivered from the radio-frequency signal circuit 2, and notification information for notifying the user of the state change between the communicable and incommunicable states as delivered from the detection/notification unit 21. The output unit 34 turns the information into a signal s1 which is compatible with the peripheral equipment 101, and transfers the signal s1 to the peripheral equipment 101.

Figure 14:
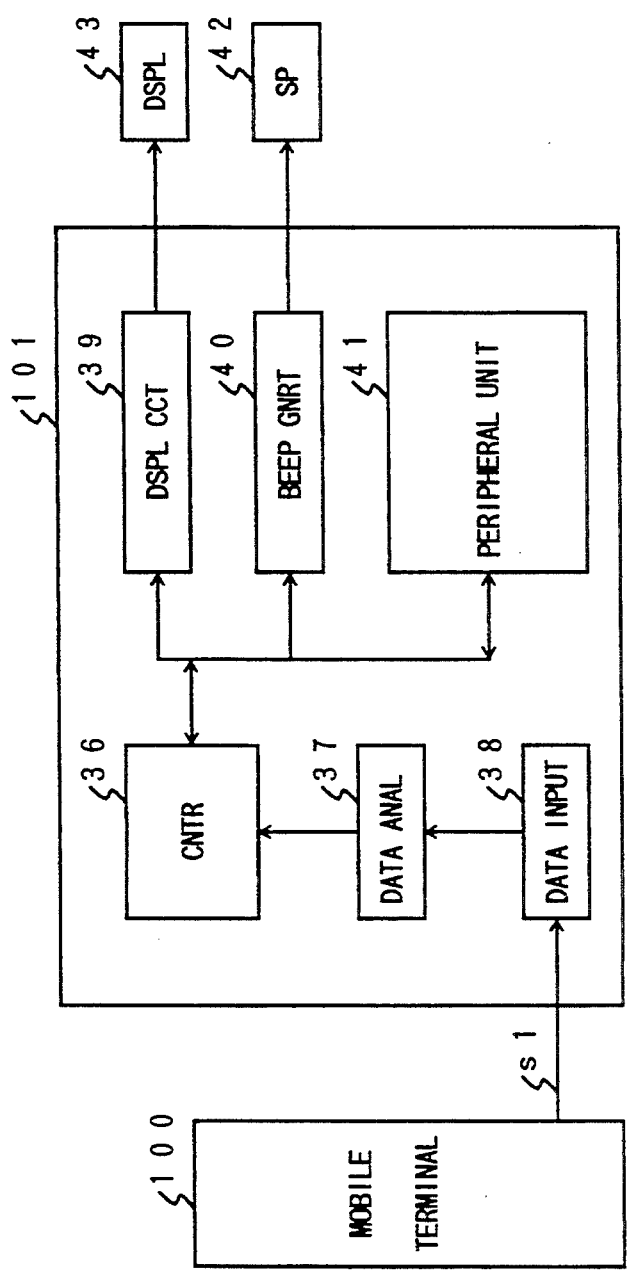
FIG. 14 is a block diagram showing the construction of a peripheral equipment in the seventh embodiment of the present invention.

An example of construction of the peripheral equipment 101 is shown in FIG. 14. A data input unit 38 serving as input means receives the signal s1 transferred from the output unit 34 of the mobile terminal 100. A data analyzer 37 serving as analysis means analyzes the transferred signal, and extracts the information. A controller 36 controls the whole peripheral equipment 101. A peripheral unit 41 performs the original operation of the peripheral equipment 101. A display circuit 39 serves to present a display on a display unit 43, and a beep generator 40 generates a beep through a speaker 42. As the display circuit 39 and the display unit 43, ones with which the peripheral equipment 101 is furnished are respectively utilized. In a case where the peripheral equipment 101 is not furnished a display circuit or unit, they may well be omitted from the illustrated construction. The notifying operation can be previously determined in accordance with the sort of pertinent peripheral equipment 101. Such a peripheral equipment includes, at least, input means for receiving the notifying information from the output means of the associated mobile communications equipment, analysis means for analyzing the content of the notifying information accepted by the input means, and notification means for performing a predetermined notifying operation on the basis of the analyzed result of the analysis means.

Now, the operation of this embodiment will be described with reference to FIGS. 13 and 14. As explained in relation to the foregoing embodiment shown in FIG. 1, the analyzer 7 analyzes the signal received by the radio-frequency signal circuit 2 in the state in which the mobile terminal 100 in FIG. 13 is incommunicable, that is, in which the base station is not picked up. When the base station has been caught, the detection means of the detection/notification means 21 detects the state change of the mobile terminal 100 on the basis of the analyzed result of the analyzer 7. Thereafter, the notification means of the detection/notification unit 21 transfers the notifying information as the signal s1 to the peripheral equipment 101 through the output unit 34 in order to notify the state change from the incommunicable state into the communicable state. The notifying information is delivered to the data analyzer 37 of the peripheral equipment 101 through the data input unit 38 thereof, and is recognized as such in this data analyzer. Then, the data analyzer 37 informs the controller 36 that the notifying information has been transferred to the peripheral equipment 101. In the case where the display unit 43 is included in the navigation equipment, the car TV set, the portable TV set, or the like, the controller 36 having received the notifying information controls the display circuit 39 so as to flicker the screen of the display unit 43 or to display the message thereon. On the other hand, in the case where the speaker 42 as speech output means is included in the car stereo, the headphone stereo, the tape recorder, the hearing aid, or the like, the controller 36 controls the beep generator 40 so as to emit the beep from the speaker 42. In this way, the peripheral equipment 101 can notify the user that the mobile terminal 100 has become communicable. Although the changes of the display and the generation of the beep have been exemplified here, it is a matter of course that a function peculiar to such a peripheral equipment may well be utilized. Any of multifarious notifying methods can be obtained in such a manner that a vocal message is output by a voice producing function, that music is played by a melody producing function, and that vibrations are developed by a vibration producing function.

Besides, a voice input/output terminal such as microphone terminal or headphone terminal can be utilized as the interface between the mobile terminal and the peripheral equipment. In this case, vocal information to be emitted may well be produced in the mobile terminal and then transferred to the peripheral equipment. Alternatively, specific signals may well be stipulated between the mobile terminal and the peripheral equipment beforehand, so as to give notification by a corresponding one of predetermined notifying methods when any of the specific signals has been detected.

Figure 15:
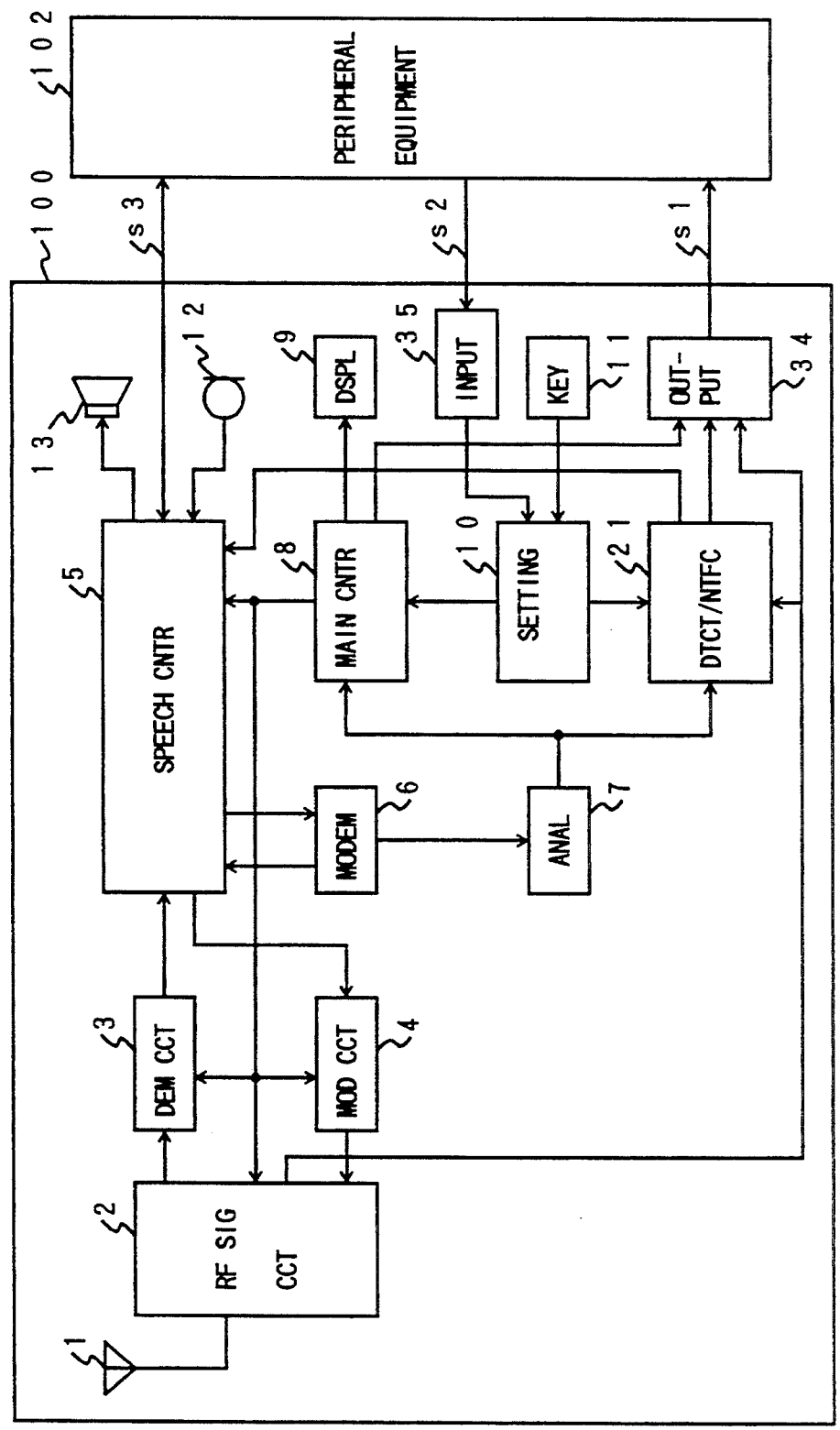
FIG. 15 is a block diagram showing the eighth embodiment of the present invention.

Meanwhile, the peripheral equipment may well be one having a communicating function, for example, the FAX (facsimile) equipment or a data communications terminal. FIG. 15 is a block diagram showing an example in which the peripheral equipment having the communicating function is connected to the mobile communications terminal equipment. Referring to the figure, numeral 100 indicates the mobile terminal. The peripheral equipment 102 connected to the mobile terminal 100 is the FAX equipment or the like having the communicating function. The mobile terminal 100 is constructed substantially similarly to the embodiment shown in FIG. 13, and identical numerals are respectively assigned to the blocks of the terminal 100 having the same operations as in FIG. 13. The points of difference of this embodiment shown in FIG. 15 from the foregoing embodiment shown in FIG. 13 are that an input unit 35 is added and is supplied with the output signal s2 of control information from the peripheral equipment 102, and that the communications signals s3 of the peripheral equipment 102 are supplied to and from the speech controller 5 in order to connect the peripheral equipment 102 with the radio channel of the mobile terminal 100. The input unit 35 functions to supply the setting unit 10 with the signal s2 transferred from the peripheral equipment 102, likewise to the operation of the key circuit 11. Thus, the mobile terminal 100 can be controlled likewise to the keying operation by the peripheral equipment 102. The communications signals s3 are the output/input signals of transmission/reception information in the peripheral equipment 102.

The output signal of the transmission information is sent to the opposite terminal of the communications over the radio channel via the speech controller 5, modulation circuit 4, radio-frequency signal circuit 2 and antenna 1. Contrariwise, the input signal of the reception information is sent to the peripheral equipment 102 via the antenna 1, radio-frequency signal circuit 2, demodulation circuit 3 and speech controller 5. The output unit 34 receives control information for controlling the peripheral equipment 102 as delivered from the main controller 8, electric field strength information delivered from the radio-frequency signal circuit 2, and notification information for notifying the user of the state change between the communicable and incommunicable states as delivered from the detection/notification unit 21. The output unit 34 turns the information into a signal s1, and transfers the signal s1 to the peripheral equipment 102.

An example of construction of the peripheral equipment 102 is shown in FIG. 16. A data input unit 38 receives the signal s1 transferred from the output unit 34 of the mobile terminal 100. A data analyzer 37 analyzes the transferred signal, and extracts the information. A controller 46 controls the whole peripheral equipment 102. A peripheral unit 47 performs the original operation of the peripheral equipment 102. A display circuit 39 serves to present a display on a display unit 43, and a beep generator 40 generates a beep through a speaker 42. A dialing starter 45 starts the dialing function of the controller 46 upon receiving the notifying information from the data analyzer 37. A modem 44 converts digital information into an analog signal (the signal s3), and converts an analog signal (the signal s3) into digital information. A control data output unit 48 transfers control data (the signal s2) for controlling the mobile terminal 100 from the peripheral equipment 102. In this case, such a peripheral equipment is further provided with an instruction input unit which accepts the identification information of the other mobile communications equipment, a memory which stores therein the identification information accepted by the instruction input unit, a start command unit which commands the associated mobile communications equipment to start the commencement of the communications in accordance with the identification information stored in the memory, and a checker which is endowed with an autodialing mode that causes the start command unit to operate in response to the state change from the incommunicable state into the communicable state as detected on the basis of the output of the analysis means, on condition that the communications commencement instruction has been accepted by the instruction input unit in the incommunicable state.

An ordinary interface (for example, "X.25" in the case of packet communications) is utilized as the interface between the mobile terminal 100 and the peripheral equipment 102 such as FAX equipment or data communications terminal. The communications are done in such a way that specified signal patterns to be transmitted and received are stipulated in the signals s1 and s2 beforehand.

Now, the operation of the embodiment shown in FIGS. 15 and 16 will be described with reference to FIG. 17. FIG. 17 is a flow chart for explaining the operation of this embodiment. First, the user performs a dialing operation with the peripheral equipment 102 (step 85). Then, the controller 46 responsively controls the control data output unit 48 so as to supply the mobile terminal 100 with the control signal s2 for ascertaining if the communications are possible. On the side of the mobile terminal 100, the main controller 8 having received the control signal s2 through the input unit 35 as well as the setting unit 10 transfers the signal s1 indicating if the communications are possible, from the output unit 34 to the peripheral equipment 102. On the side of the peripheral equipment 102, the signal s1 is received by the data input unit 38, the content of this signal is analyzed by the data analyzer 37, and the analyzed result is received by the controller 46. When the received result indicates the communicability, the controller 46 decides that the dialing is possible (step 86). In this case, the controller 46 transfers dialing information to the mobile terminal 100 through the control data output unit 48 at a step 87. Thus, the dialing operation is executed. After the peripheral equipment 102 has been connected with the other equipment over the radio channel, it transmits and receives the signals s3 through the modem 44, thereby to communicate with the opposite equipment (step 88).

On the other hand, in a case where the communications are impossible, that is, where the dialing has been decided impossible at the step 86, the routine proceeds to a step 89. In this case, the controller 46 controls the display circuit 39 so as to display "ON STANDBY TO DIAL" on the display unit 43 at the step 89, thereby to inform the user that the dialing is impossible. Thenceforth, it is waited at a step 90 there is a wait for the dialing start unit 45 to become operable. As explained in relation to the foregoing embodiment shown in FIG. 1, the analyzer 7 analyzes the signal received by the radio-frequency signal circuit 2 in the incommunicable state in which the base station is not picked up. When the base station has been picked up, the detection means of the detection/notification means 21 detects the state change of the mobile terminal 100 on the basis of the analyzed result of the analyzer 7. Thereafter, the notification means of the detection/notification unit 21 transfers the notifying information (the signal s1) to the peripheral equipment 102 through the output unit 34 in order to notify the snare change from the incommunicable state into the communicable state. The notifying information is delivered to the data analyzer 37 of the peripheral equipment 102 through the data input unit 38 thereof, and is recognized as such in this data analyzer. Then, the data analyzer 37 informs the dialing start unit 45 of the recognition of the notifying information. The dialing start unit 45 responsively informs the controller 46 that the notifying information has been transferred to the peripheral equipment 102, and it also starts the dialing operation. Then, the routine proceeds to the step 87, at which the controller 46 transfers dialing information to the mobile terminal 100 through the control data output unit 48. Thus, the dialing operation is executed. After the peripheral equipment 102 has been connected with the other equipment over the radio channel, it communicates with the opposite equipment through the modem 44 (step 88).

As thus far explained, according to this embodiment, once the user has performed the dialing operation of the peripheral equipment 102 irrespective of whether or not the mobile terminal 100 is communicable, the communications are automatically commenced upon establishment of the communicable state. Accordingly, this embodiment brings forth the effect that the user is freed from repeatedly having to confirm the state of the mobile terminal 100. Moreover, a notifying sound (beep) or the like may well be employed for informing the user that the dialing operation has been started. Further, insofar as the information can be transmitted, any expedient may be employed for the connection between the mobile terminal 100 and the peripheral equipment 102. Examples of the expedient are optical transmission, radio transmission and acoustic transmission.

As described above, according to the present invention, the state change of a mobile communications equipment based on the movement thereof, such as the state change from outside a service area into the same, can be detected and notified. The user of the equipment can know the communicability thereof without expressly checking the display of a display unit, so that the convenience of the equipment is enhanced. Especially, even when the user is driving an automobile, he/she can confirm his/her entry into the service area without any hindrance to his/her driving operation, so that the driving safety is enhanced.

What is claimed is:

1. A mobile communications equipment for communicating with another equipment through a base station, comprising:
    a radio-frequency signal circuit which receives a signal sent from the base station, and which transmits a signal directed toward said base station;
    a demodulation circuit which demodulates the signal received by said radio-frequency signal circuit;
    input/output means for delivering the signal demodulated by said demodulation circuit, to a user of said mobile communications equipment, and for accepting an input signal from said user;
    a modulation circuit which modulates the signal accepted by said input/output means, and which delivers the modulated signal to said radio-frequency signal circuit;
    analysis means for analyzing whether the signal sent from said base station is possible to be received;
    detection means for conducting a first detection of movement of said mobile communications equipment coming into an area where said signal can be received and a second detection of movement of said mobile communications equipment going out of the area where said signal can be received, in accordance with an output of said analysis means;
    notification means which includes at least two constituent means selected from the group having message output means for producing a voice message, sound output means for producing a notifying sound, optical indication means for producing an notifying light, and vibration means for producing vibrations; and
    control means which controls to let one of the plurality of means provided at said notification means notify that said first detection has been conducted and to let another of the plurality of means provided at said notification means notify that said second detection has been conducted using a different means from the means used to notify that said first detection has been conducted.

2. A mobile communications equipment as defined in claim 1,
    further comprising:
    an instruction input unit which accepts an instruction which selects from which of the plurality of means provided at said notification means should the notice be given that said first detection has been conducted, and that said second detection has been conducted at a means different from the one which gave the notice that said fist detection has been conducted; and
    said control means conducting said control by selecting from the plurality of means provided at said notification means based on each of said first and second detection.

3. A mobile communications equipment as defined in claim 2, wherein said instruction input unit further accepts an instruction for giving said notification from said notification means for either of the first and second detection; and
    said control means controls said notification means to suppress notification given by said notification means for the detection not to notify, when the instruction accepted at said instruction input unit is to notify from said notification means only for either of said first and second detection.

4. A mobile communications equipment as defined in claim 2, wherein
    said instruction input unit further accepts, as a condition for giving said notification an instruction for conducting said notification from said notification means only for the first conduct of said first detection at said detection means after said instruction is given; and
    said control means controls said notification means in accordance with said instruction accepted by said instruction input unit.

5. A mobile communications equipment as defined in claim 2, further comprising:
    timekeeping means for detecting that said mobile communications equipment is within an area where said signal can be received for a predetermined time period when said mobile communications equipment has moved into the area where said signal can be received from outside; and
    said control means disables, when said first detection has been conducted at said detecting means, notification from said notification means that said first detection has been conducted and controls notification from said notification means that said first detection has been conducted when said detection is conducted at said timekeeping means.

6. A mobile communications equipment as defined in claim 5, wherein said instruction input unit further accepts an instruction, as a conduction for giving said notification, that said mobile communications equipment is detected at said timekeeping means to be within an area where said signal can be received for a predetermined time period since said mobile communications equipment has moved into the area where said signal can be received from outside; and
    said control means conducts said control when said instruction is received at said instruction input unit.

7. A mobile communications equipment as defined in claim 2, further comprising:
    electric field strength detection means for detecting a received electric field strength of said signal received by said radio-frequency signal circuit;
    said control means which disables the notification form said notification means that said fist detection has been conducted when said fist detection has been conducted at said detection means, and gives the notification form said notification means that said first detection has been conducted when the detected electric field strength of said electric field strength detection means has reached a predetermined electric field strength.

8. A mobile communications equipment as defined in claim 7, wherein said instruction input unit further accepts an instruction to conducted said first detection at said detection means and to notify a state where detected electric field strength of said electric field strength detection means has reached a predetermined electric field strength as a condition for giving said notification; and said control means conducts said control when said instruction is accepted at said instruction input unit.

9. A mobile communications equipment as defined in claim 1, further comprising:

network registration means for registering sorts of available network;

said analysis means further analyzing whether said signal can be received at each of the registered network at said network registration means based on the signal received at said radio-frequency signal circuit;

said detection means conducting said first detection for each of said network; and said notification means notifying the sorts of network where said signal can be received when said first detection is conducted at said detection means.

10. A mobile communications equipment as defined in claim 9, further comprising network priority setting means for setting at least one type of network which preferentially selects circuits from the sorts of said networks;

said detection means detecting the network set by said network priority setting means where said signal is within an area that can be received based on the analysis of said analysis means; and said notifying means further notifies the sorts of network that allow said signal to be received at said detection means.

11. A mobile communications equipment as defined in claim 1, wherein:

the plurality of means provided at said notification means is furnished with at least two sorts of output aspects, respectively;

said instruction input unit further accepts an instruction for selecting which of the output aspects of the plurality of means provided at said notification means is to be used to notify said first detection has been conducted and which of the output aspects, different from the one used to notify said first detection, is to be used to notify said second detection has been conducted; and said control means selects said output aspects of said notification means based on each of said first detection and said second detection in accordance with the selection instruction accepted by said instruction input unit.

12. A mobile communications equipment for communicating with another equipment through a base station, comprising:

a radio-frequency signal circuit which receives a signal sent from the base station, and which transmits a signal directed toward said base station;

a demodulation circuit which demodulates the signal received by said radio-frequency signal circuit;

input/output means for delivering the signal demodulated by said demodulation circuit, to a user of said mobile communications equipment, and for accepting an input signal from said user;

a modulation circuit which modulates the signal accepted by said input/output means, and which delivers the modulated signal to said radio-frequency signal circuit;

analysis means for analyzing whether the signal sent from said base station is possible to be received;

detection means for detecting when said mobile communications equipment has moved into the area where said signal can be received, in accordance with an output of said analysis means;

an instruction input unit which accepts identification information of the other equipment from said user;

a memory which stores therein the identification information accepted by said instruction input unit;

a starter unit which performs calls origination in accordance with the stored identification information of said memory; and a checker which is furnished with an autodialing mode for commanding said starter unit to perform call origination in a condition where a command for calling origination is accepted at said instruction input unit when said mobile communications equipment is within the area where said signal can be received, to disable the call origination in a condition where a command for calling origination is accepted at said instruction input unit when said mobile communications equipment is outside the area where said signal can be received, and to perform call origination when said mobile communications equipment is detected, at said detection means, to have moved into the area where said signal can be received.

13. A mobile communications equipment as defined in claim 12, wherein said instruction input unit further accepts, from said autodialing mode, the instruction to call;

said checker enables said autodialing mode when an instruction for calling by said autodialing mode is accepted at said instruction input unit and disables said autodialing mode when an instruction for calling by said autodialing mode is not accepted at said instruction input unit.

14. A mobile communications equipment as defined in claim 12, further comprising:

network registration means for registering sorts of available network;

said analysis means further analyzing whether said signal can be received at each network registered at said network registration means based on the signal received at said radio-frequency signal circuit; and the autodialing mode of said detection means instruction said starter to call origination of the network where said signal can be received.

15. A mobile communications equipment as defined in claim 14, further comprising:

network priority level setting means for setting priority levels for said sorts of network;

said detection means detecting any network of higher priority level selected by said network priority level setting means when there is a plurality of networks which can receive said signal;

the autodialing mode of said detection means instructing said starter to call origination of the network with a higher priority level detected by said detection means.

16. A method for notification in a mobile communications equipment which communicates with another equipment through transmitting and receiving of signals with a base station, comprising the steps of:

accepting an instruction as to a user of said mobile communications equipment is to be notified that the first detection which detects the movement of said mobile communications equipment coming into the area where the signal transmitted from said base station can be received and the second detection which detects the movement of said mobile communications equipment going out of the area where said signal can be received;

analyzing whether said signal sent from said base station can be received;

conducting said first and second detection based on said analysis; and notifying that said first detection has been conducted by at least one notifying expedient selected from the group consisting of production of a voice message, that of a notifying sound, that of a notifying light, and that of vibrations, when said first detection has been conducted, and notifying that said second detection has been conducted when said second detection has been conducted by a method different from the one used in informing said first detection among said plurality of methods of notification, subject to the instruction of giving the notification.

17. A method for notification in a mobile communications equipment as defined in claim 16, comprising the steps of:

further accepting an instruction which selects from which of the plurality of means provided at said notification means should the notice be given that said first detection has been conducted, and that said second detection has been conducted at a means different from the one which gave the notice that said first detection has been conducted; and selecting the notifying expedient in accordance with the accepted selection instruction, and then notifying each of the first detection and the second detection has been conducted by the selected notifying expedient.

18. A method for notification in a mobile communications equipment as defined in claim 16 comprising the steps of:

conducting said first detection for each of said registered network; and notifying the sorts of network where said signal can be received when said first detection has been conducted.

19. A mobile communications system comprising a mobile communications equipment which communicates with another equipment through a base station, and a peripheral equipment which is connected to the mobile communications equipment;

said mobile communications equipment including:

a radio-frequency signal circuit which receives a signal sent from the base station, and which transmits a signal directed toward said base station;

a demodulation circuit which demodulates the signal received by said radio-frequency signal circuit;

input/output means for delivering the signal demodulated by said demodulation circuit, to a user of said mobile communications equipment, and for accepting an input signal from said user;

a modulation circuit which modulates the signal accepted by said input/output means, and which delivers the modulated signal to said radio-frequency signal circuit;

analysis means for analyzing whether the signal sent from said base station is possible to be received;

detection means for detecting when said mobile communications equipment has moved into the area where said signal can be received in accordance with an output of said analysis means; and output means for delivering predetermined notifying information to said peripheral equipment when said detection means has detected;

said peripheral equipment including:

input means for receiving the notifying information delivered from said output means of said mobile communications equipment;

an instruction input unit which accepts identification information of said another equipment from the user of said mobile communications equipment;

a memory which stores therein the identification information accepted by said instruction input unit;

a starter unit which calls origination in accordance with the stored identification information of said memory; and a checker which is furnished with an autodialing mode: for commanding said starter unit to call origination in a condition where a command for calling origination is accepted at said instruction input unit when said mobile communications equipment is within the area where said signal can be received, for disabling the call origination in a condition where a command for calling origination is accepted at said instruction input unit when said mobile communications equipment is outside the area where said signal can be received, and for calling origination when said mobile communications equipment is detected, at said detection means, to have moved into the area where said signal can be received;

* * * * *